US009467887B2

(12) United States Patent
Feng et al.

(10) Patent No.: US 9,467,887 B2
(45) Date of Patent: Oct. 11, 2016

(54) MINIMIZATION OF DRIVE-TESTS CONTROL METHOD, SYSTEM, AND NETWORK ELEMENT DEVICE

(71) Applicant: HUAWEI TECHNOLOGIES CO., LTD., Shenzhen, Guangdong (CN)

(72) Inventors: Li Feng, Xi'an (CN); Dong Zhao, Shanghai (CN); Dong Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 14/228,736

(22) Filed: Mar. 28, 2014

(65) Prior Publication Data
US 2014/0213194 A1 Jul. 31, 2014

Related U.S. Application Data

(63) Continuation of application No. PCT/CN2012/082554, filed on Oct. 8, 2012.

(30) Foreign Application Priority Data

Sep. 30, 2011 (CN) .......................... 2011 1 0298036

(51) Int. Cl.
H04B 17/00 (2015.01)
H04W 24/10 (2009.01)
(Continued)

(52) U.S. Cl.
CPC ............. *H04W 24/10* (2013.01); *H04W 36/14* (2013.01); *H04W 48/18* (2013.01)

(58) Field of Classification Search
CPC ... H04W 24/10; H04W 24/08; H04W 16/18; H04W 24/04; H04W 36/0033; H04W 36/0072; H04W 36/14

USPC ...................................................... 455/67.11
See application file for complete search history.

(56) References Cited

U.S. PATENT DOCUMENTS

2011/0269402 A1* 11/2011 Yi .......................... H04W 24/08
                                                      455/67.11
2013/0040634 A1*  2/2013 Johansson ............. H04W 24/10
                                                      455/422.1
(Continued)

FOREIGN PATENT DOCUMENTS

CN          101998463 A        3/2011

OTHER PUBLICATIONS

International Search Report, dated Jan. 17, 2013, in corresponding International Application No. PCT/CN2012/082554 (4 pp.).

(Continued)

Primary Examiner — Ajibola Akinyemi
(74) Attorney, Agent, or Firm — Staas & Halsey LLP

(57) ABSTRACT

Embodiments of the present invention provide an MDT control method, system, and network element device. The network element device acquires an MDT PLMN list, where the MDT PLMN List includes at least two PLMN identities, and UEs in at least two PLMNs corresponding to the at least two PLMN identities can perform MDT in the at least two PLMNs; when a first UE accesses a current PLMN, the network element device acquires and determines that a user intention of the first UE is to permit performing the MDT; the network element device judges whether the MDT PLMN List includes an HPLMN identity or an EHPLMN identity of the first UE; and when the MDT PLMN List includes the HPLMN identity or EHPLMN identity of the first UE, the network element device instructs the first UE to perform the MDT measurements.

27 Claims, 29 Drawing Sheets

(51) Int. Cl.
    *H04W 48/18*    (2009.01)
    *H04W 36/14*    (2009.01)

(56)         References Cited

U.S. PATENT DOCUMENTS

2013/0077517 A1*  3/2013  Cho .................. H04L 43/50
                                                  370/252
2014/0099940 A1*  4/2014  Kim ................... H04W 24/10
                                                  455/422.1
2014/0295840 A1* 10/2014  Keskitalo .......... H04W 36/0061
                                                  455/436

OTHER PUBLICATIONS

Extended European Search Report dated Mar. 2, 2015 in related European Patent Application No. 12837563.1 (17 pages).
Mediatek: "*ePLMN support for MDT*"; 3GPP Draft; R2-114500 EPLMN Support for MDT, 3rd Generation Partnership Project (3GPP), Mobile Competence Centre; 650, Route des Lucioles; F-06921 Sophia-Antipolis Cedex; France, vol. RAN WG2, no. Athens, Greece; 20110822, Aug. 16, 2011, XP050540152 (5 pages).

Teliasonera: "*Inter-PLMN MDT for operator that uses more than one PLMN—with ASN impact*", 3GPP Draft; S5-112373 CR R11 32422 Interplmn MDT with ASN Impact, 3rd Generation Partnership Project (3GPP), Mobile Competence Centre; 650, Route des Lucioles; F-06921 Sophia-Antipolis Cedex; France, vol. SA WG5, no. Istanbul, Turkey; 20110822, Aug. 12, 2011, XP050551296 (16 pages).
PCT International Search Report (ISR) and Written Opinion, PCT Forms PCT/ISA/210, PCT/ISA/220, and PCT/ISA/237 dated Jan. 17, 2013 in corresponding PCT Application No. PCT/CN2012/082554 (10 pages).
"*MDT at roaming and inter-PLMN mobility*"; 3GPP TSG-RAN WG3 meeting #73; R3-111930; TeliaSonera; Athens, Greece, Aug. 22-26, 2011 (5 pages).
"3rd Generation Partnership Project; Technical Specification Group Services and System Aspects; Telecommunication management; Subscriber and equipment trace; Trace control and configuration management (Release 10)"; 3GPP TS 32.422 V10.4.0 (Jun. 2011) (115 pages).
"3rd Generation Partnership Project; Technical Specification Group Services and System Aspects; Telecommunication management; Subscriber and equipment trace; Trace control and configuration management (Release 11)"; 3GPP TS 32.422 V11.0.0 (Jun. 2011) (115 pages).

* cited by examiner

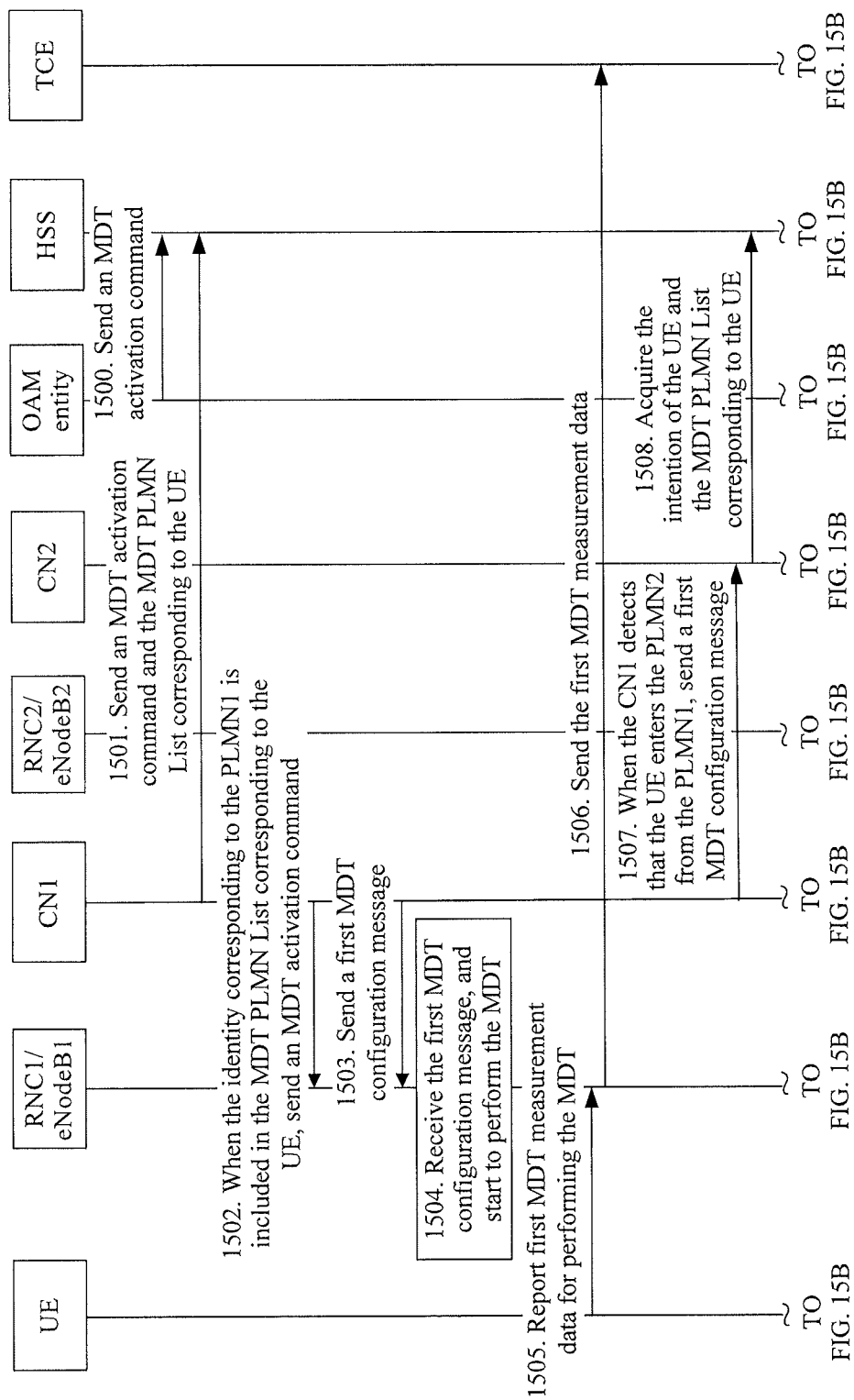

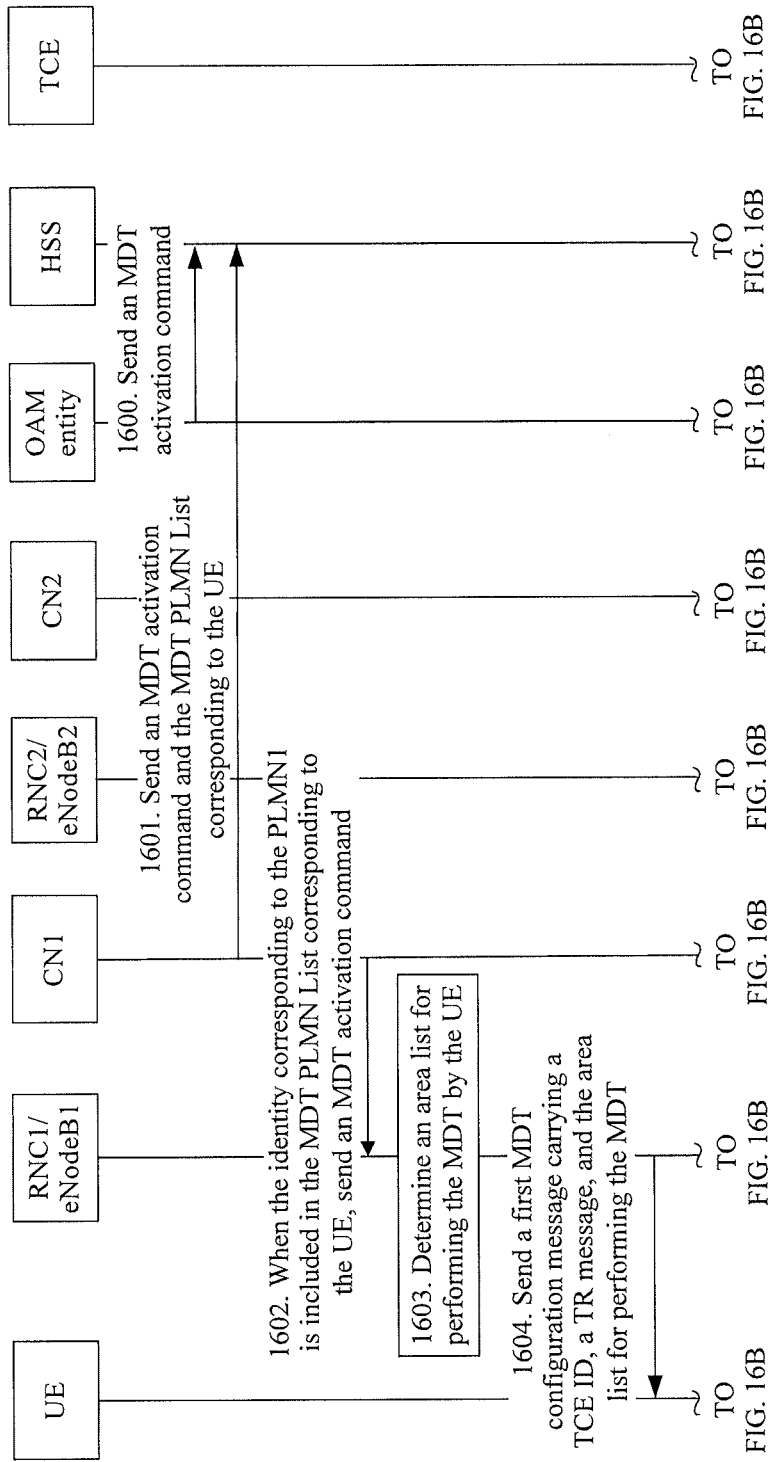

US 9,467,887 B2

MINIMIZATION OF DRIVE-TESTS CONTROL METHOD, SYSTEM, AND NETWORK ELEMENT DEVICE

CROSS-REFERENCE TO RELATED APPLICATIONS

This application is a continuation of International Application No. PCT/CN2012/082554, filed on Oct. 8, 2012, which claims priority to Chinese Patent Application No. 201110298036.9, filed on Sep. 30, 2011, both of which are hereby incorporated by reference in their entireties.

TECHNICAL FIELD

The present invention relates to the field of communications technologies, and in particular, to a minimization of drive-tests control method, system, and network element device.

BACKGROUND

In an existing communication system, a user equipment (User Equipment, UE for short below) is usually controlled to perform minimization of drive-tests (Minimization of Drive-Tests, MDT for short below) measurements to collect data, so as to implement coverage and capacity (Coverage and Capacity, C&C for short below) optimization, mobility optimization, common channel parameter optimization, quality of service (Quality of Service, QoS for short below) verification, and so on for a network system.

MDT specified in the 3rd Generation Partnership Project (3rd Generation Partnership Project, 3GPP for short below) is classified into two types: management based MDT (Management based MDT) and signaling based MDT (Signaling based MDT). For the management based MDT, a radio network controller (Radio Network Controller, RNC for short below) can only select a UE in a current public land mobile network (Public Land Mobile Network, PLMN for short below) to perform MDT measurements. The current PLMN is definitely a home public land mobile network (Home Public Land Mobile Network, HPLMN for short below) of the UE in the service scope of the radio network controller. The UE can only perform MDT measurements in the scope of the current PLMN, namely, the HPLMN. For the signaling based MDT, an international mobile subscriber identity (international mobile subscriber identity, IMSI for short below) of the UE performing MDT measurements is specified in an operations, administration and maintenance (Operations, Administration and Maintenance, OAM for short below) entity in advance. The OAM entity sends an MDT activation command carrying an MDT configuration message to the UE through a core network (Core Network, CN for short below) node and an RNC, so as to instruct the UE to perform MDT measurements in the scope of the current PLMN, namely, the HPLMN of the UE.

In the process of implementing the present invention, it is found that the prior art has at least the following problem: In the prior art, the UE can only perform MDT measurements in the scope of the current PLMN, namely, the HPLMN of the UE, and cannot implement MDT measurements after the UE moves to another PLMN.

SUMMARY

Embodiments of the present invention provide a minimization of drive-tests control method, system, and network element device, so that a UE can perform MDT measurements after moving to another PLMN.

An embodiment of the present invention provides a minimization of drive-tests control method, including: acquiring, by a network element device, a minimization of drive-tests public land mobile network list, where the minimization of drive-tests public land mobile network list includes at least two public land mobile network identities, and user equipments in at least two public land mobile networks corresponding to the at least two public land mobile network identities can perform minimization of drive-tests in the at least two public land mobile networks; when a first user equipment accesses a current public land mobile network, acquiring and determining, by the network element device, that a user intention of the first user equipment is to permit performing the minimization of drive-tests; judging, by the network element device, whether the minimization of drive-tests public land mobile network list includes a home public land mobile network identity or an equivalent home public land mobile network identity of the first user equipment; and when the minimization of drive-tests public land mobile network list includes the home public land mobile network identity or equivalent home public land mobile network identity of the first user equipment, instructing, by the network element device, the first user equipment to perform the minimization of drive-tests.

An embodiment of the present invention further provides a minimization of drive-tests control method, including: receiving a user intention of a first user equipment and a corresponding minimization of drive-tests public land mobile network list that are sent by a core network node, where the minimization of drive-tests public land mobile network list includes at least two public land mobile network identities, and user equipments in at least two public land mobile networks corresponding to the at least two public land mobile network identities can perform minimization of drive-tests in the at least two public land mobile networks; when the first user equipment accesses a current public land mobile network, and the user intention of the first user equipment is to permit performing the minimization of drive-tests, judging whether the minimization of drive-tests public land mobile network list includes an identity of the current public land mobile network; and when the MDT public land mobile network list includes the identity of the current public land mobile network, instructing the first user equipment to perform the minimization of drive-tests.

An embodiment of the present invention further provides a network element device, including: an obtaining module, configured to acquire a minimization of drive-tests public land mobile network list, where the minimization of drive-tests public land mobile network list includes at least two public land mobile network identities, and user equipments in at least two public land mobile networks corresponding to the at least two public land mobile network identities can perform minimization of drive-tests in the at least two public land mobile networks; a determining module, configured to: when a first user equipment accesses a current public land mobile network, acquire and determine that a user intention of the first user equipment is to permit performing the minimization of drive-tests; a judging module, configured to judge whether the minimization of drive-tests public land mobile network list includes a home public land mobile network identity or an equivalent home public land mobile network identity of the first user equipment; and an instructing module, configured to: when the minimization of drive-tests public land mobile network list includes the home public land mobile network identity or equivalent home public land mobile network identity of the first user equipment, instruct the first user equipment to perform the minimization of drive-tests.

An embodiment of the present invention further provides a network element device, including: a receiving module, configured to receive a user intention of a first user equipment and a corresponding minimization of drive-tests public land mobile network list that are sent by a core network node, where the minimization of drive-tests public land mobile network list includes at least two public land mobile network identities, and user equipments in at least two public land mobile networks corresponding to the at least two public land mobile network identities can perform minimization of drive-tests in the at least two public land mobile networks; a judging module, configured to: when the first user equipment accesses a current public land mobile network, and the user intention of the first user equipment is to permit performing the minimization of drive-tests, judge whether the minimization of drive-tests public land mobile network list includes an identity of the current public land mobile network; and an instructing module, configured to: when the MDT public land mobile network list includes the identity of the current public land mobile network, instruct the first user equipment to perform the minimization of drive-tests.

An embodiment of the present invention further provides a minimization of drive-tests control system, including the network element device.

In the minimization of drive-tests control method, system, and network element device in the embodiments of the present invention, by using the above technical solutions, as long as an intention of a user equipment is to permit performing minimization of drive-tests, and an MDT PLMN List includes a home public land mobile network identity or an equivalent home public land mobile network identity of the user equipment, the user equipment may be selected to perform the minimization of drive-tests. The technical solutions of the embodiments of the present invention are used to solve the technical problem in the prior art that the UE can only perform MDT measurements in the scope of the current PLMN, namely, the HPLMN of the UE, so that the UE can perform MDT measurements after the UE moves to another PLMN.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 15A and FIG. 15B are a signaling diagram of an MDT control method according to another embodiment of the present invention;

FIG. 16A and FIG. 16B are a signaling diagram of an MDT control method according to another embodiment of the present invention;

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
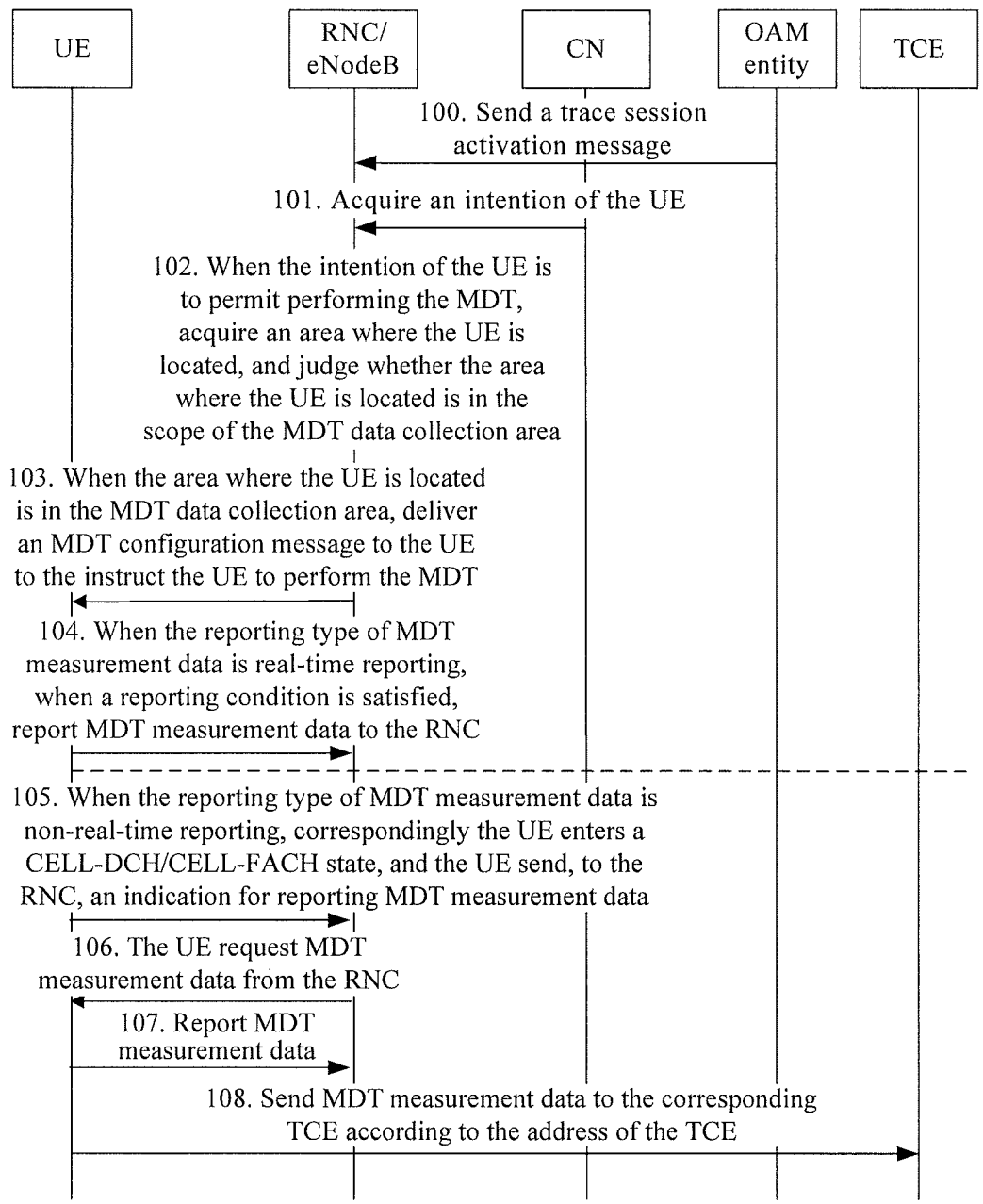
FIG. 1 is a flowchart of a management based MDT control method.

FIG. 1 is a flowchart of a management based MDT control method. As shown in FIG. 1, the management based MDT control method in this embodiment may specifically include the following contents:

100. An OAM entity sends a trace session activation (Trace Session Activation) message to an RNC/eNodeB.

The trace session activation message carries an MDT data collection area, a reporting type of MDT measurement data, an address of a trace collection entity (Trace Collection Entity, TCE for short below), and so on. The MDT data collection area may be a cell (CELL), a routing area (Routing Area), and/or a location area (Location Area), and all the cell (CELL), the routing area (Routing Area) and the location area (Location Area) are located in an HPLMN or EHPLMN of a UE. The reporting type of MDT measurement data is real-time reporting or non-real-time reporting.

101. The RNC acquires an intention of the UE from a CN.

The intention of the UE is to permit performing MDT or not to permit performing MDT.

102. When the intention of the UE is to permit performing the MDT, the RNC acquires an area where the UE is located, and judges whether the area where the UE is located is in the scope of the MDT data collection area.

When the intention of the UE is not to permit performing the MDT, the procedure ends.

103. When the area where the UE is located is in the scope of the MDT data collection area, the RNC delivers an MDT configuration message to the UE to instruct the UE to perform the MDT.

The MDT configuration message is configured by the RNC/eNodeB according to the trace session activation message.

When the area where the UE is located is not in the scope of the MDT data collection area, the RNC does not deliver an MDT configuration message to the UE, and the UE also does not perform the MDT.

104. When the reporting type of MDT measurement data is real-time reporting, when a reporting condition is satisfied, the UE reports MDT measurement data to the RNC.

Optionally, the method further includes the following steps 105 to 108:

105. When the reporting type of MDT measurement data is non-real-time reporting, correspondingly the UE enters a CELL-DCH/CELL-FACH state, and the UE send, to the RNC, an indication for reporting MDT measurement data.

106. The UE request MDT measurement data from the RNC.

107. The UE reports MDT measurement data to the RNC.

108. The RNC sends MDT measurement data to the corresponding TCE according to the address of the TCE.

The technical solution shown in FIG. 1 is a management based MDT control process in the prior art. By using the technical solution shown in FIG. 1, the UE can only perform MDT in the scope of the HPLMN or EHPLMN, that is, the UE can only perform MDT in the home network where the UE is currently registered. When moving to a visited network, the UE is not selected to perform MDT, and the MDT task in the home network is not continued.

Figure 2:
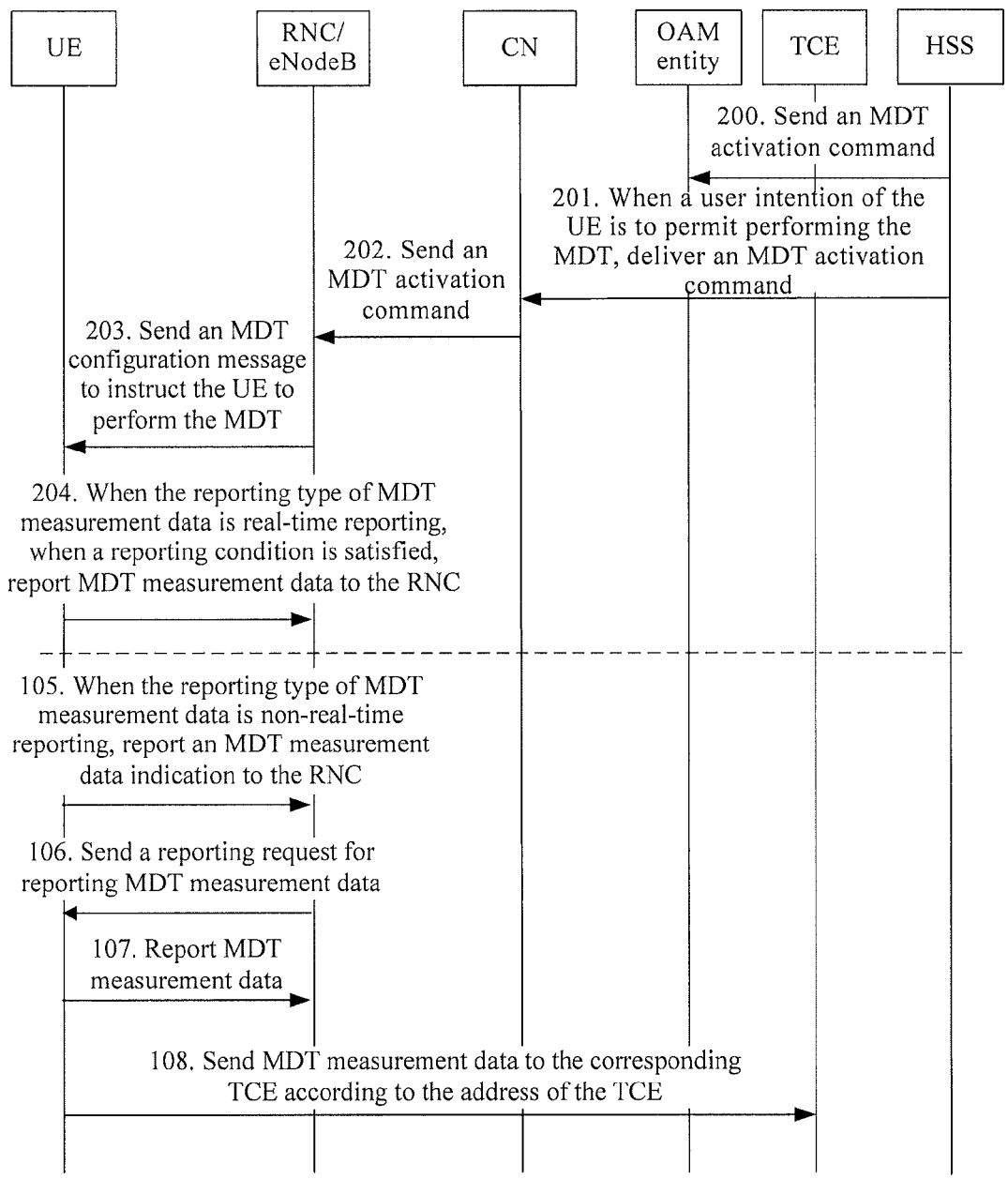
FIG. 2 is a flowchart of a signaling based MDT control method.

FIG. 2 is a flowchart of a signaling based MDT control method. As shown in FIG. 2, the signaling based MDT control method in this embodiment may specifically include the following contents.

200. An OAM entity sends an MDT activation command to a home subscriber server (home Subscriber Server, HSS for short below).

The MDT activation command includes a UE identity (for example, an international mobile subscriber identity of a UE (International Mobile Subscriber Identity Number, IMSI for short below)), a trace reference (Trace Reference, TR for short below), an MDT data collection area, an MDT data reporting trigger manner, and so on.

201. The HSS searches to determine whether a stored user intention of the UE is to permit performing MDT, and if yes, delivers an MDT activation command to a CN node.

202. The CN sends an MDT activation command to an RNC.

203. The RNC/eNodeB sends an MDT configuration message to the corresponding UE to instruct the UE to perform the MDT.

The MDT configuration message is configured by the RNC/eNodeB according to the MDT activation command.

204. When the reporting type of MDT measurement data is real-time reporting, when a reporting condition is satisfied, the UE reports MDT measurement data to the RNC.

Optionally, after step 204, the method may further include steps 105 to 108 of the method shown in FIG. 1.

The technical solution shown in FIG. 2 is a signaling based MDT control process in the prior art. By using the technical solution shown in FIG. 2, the UE can only perform MDT in the scope of the HPLMN or EHPLMN, that is, the UE can only perform MDT in the home network where the UE is currently registered. When moving to a visited network, the UE is not selected to perform MDT, and the MDT task configured in the home network is not continued.

In the technical solutions shown in FIG. 1 and FIG. 2, the UE can only perform MDT in the scope of the corresponding HPLMN or EHPLMN. In order for the UE to perform MDT after moving to another PLMN, the following technical solution of the embodiment of the present invention may be used.

Figure 3:
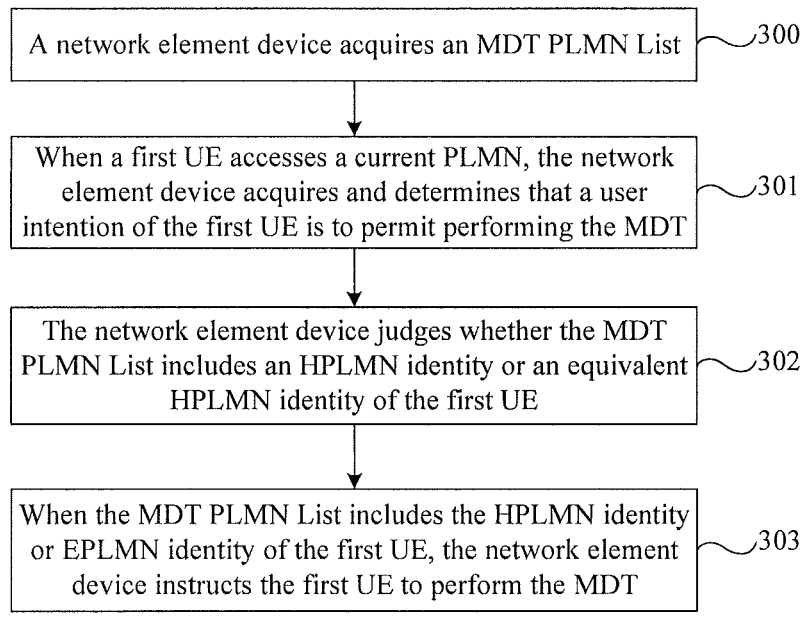
FIG. 3 is a flowchart of a minimization of drive-tests control method according to an embodiment of the present invention.

FIG. 3 is a flowchart of a minimization of drive-tests control method according to an embodiment of the present invention. As shown in FIG. 3, the minimization of drive-tests control method in this embodiment may specifically include the following contents.

300. A network element device acquires an MDT PLMN List.

The MDT PLMN List includes at least two PLMN identities, and UEs in at least two PLMNs corresponding to the at least two PLMN identities can perform MDT in the at least two PLMNs; that is, when a UE belonging to either one of the at least two PLMNs moves to the other PLMN of the at least two PLMNs, the UE can still perform the MDT.

301. When a first UE accesses a current PLMN, the network element device acquires and determines that a user intention of the first UE is to permit performing the MDT.

302. The network element device judges whether the MDT PLMN List includes an HPLMN identity or an equivalent HPLMN (Equivalent HPLMN, EHPLMN for short below) identity of the first UE.

303. When the MDT PLMN List includes the HPLMN identity or EHPLMN identity of the first UE, the network element device instructs the first UE to perform the MDT.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Optionally, in the above embodiment, when the MDT PLMN List includes the HPLMN identity or EHPLMN identity of the first UE, the network element device does not instruct the first UE to perform the MDT, and the procedure ends.

Optionally, the network element device in the above embodiment may be an RNC/eNodeB, or the network element device is a CN node.

Optionally, when the network element device in the above embodiment is the CN node, step 300 in the above embodiment may be acquiring, by the CN node, an MDT PLMN List from the CN node, where the MDT PLMN List is pre-configured in the CN node by an OAM entity. Step 301 in the above embodiment may be acquiring and determining, from an HSS by the CN node, that the user intention of the first UE is to permit performing the MDT.

Further, optionally, when the network element device is the CN node, and the type of the MDT is management based MDT, step 303 in the above embodiment may specifically include: sending, by the CN node to the RNC/eNodeB, the user intention of the first UE to permit performing the MDT, so as to instruct the RNC/eNodeB to select the first UE to perform the MDT, and the RNC/eNodeB delivers a first MDT configuration message to the first UE to instruct the first UE to perform the MDT measurements, where the first MDT message is configured by the RNC/eNodeB according to a received trace session activation message that is sent by the OAM entity and carries a reporting type of MDT measurement data, an address of a TCE, and a trace reference carrying an identity of the current PLMN.

Further, optionally, when the network element device is the CN node, the network element device may send an MDT PLMN List to the first UE, so that the UE determines, according to the MDT PLMN List, an area for performing the MDT.

Optionally, when the network element device in the above embodiment is the RNC/eNodeB, step 300 in the above embodiment may be acquiring, by the RNC/eNodeB, an MDT PLMN List from the RNC/eNodeB, where the MDT PLMN List is pre-configured in the RNC/eNodeB by the OAM entity; or receiving, by the RNC/eNodeB, an MDT PLMN List sent by the CN node, where the MDT PLMN List is pre-configured in the CN node by the OAM entity. Step 301 in the above embodiment may be receiving, by the RNC/eNodeB, the user intention of the first UE to permit performing the MDT, which is sent by the CN node, where the user intention of the first UE to permit performing the MDT is acquired by the CN node from the HSS.

Further, optionally, when the network element device is the RNC/eNodeB, and the type of the MDT is management based MDT, before step 302 in the above embodiment, the method may further include: receiving, by the RNC/eNodeB, a trace session activation message sent by the OAM entity, where the trace session activation message carries a reporting type of MDT measurement data, an address of a TCE, and a trace reference carrying an identity of the current PLMN.

When the network element device is the RNC/eNodeB, and the type of the MDT is management based MDT, further, optionally, step 303 in the above embodiment may specifically include:

(1) receiving, by the RNC/eNodeB, the user intention of the first UE to permit performing the MDT, which is sent by the CN node;

(2) selecting, by the RNC/eNodeB, the first UE to perform the MDT;

(3) configuring, by the RNC/eNodeB, the first MDT configuration message according to the trace session activation message; and (4) sending, by the RNC/eNodeB, the first MDT configuration message to the first UE, so as to instruct the first UE to perform the MDT measurements.

Optionally, when the network element device is the RNC/eNodeB, and the type of the MDT is management based MDT, when the reporting type of MDT measurement data is non-real-time reporting, the configuring, by the RNC/eNodeB, the first MDT configuration message according to the trace session activation message in (3) of the above embodiment, includes: configuring, by the RNC/eNodeB according to the trace session activation message, the first MDT configuration message carrying the address of the TCE and the trace reference.

Optionally, when the network element device is the RNC/eNodeB, and the type of the MDT is management based MDT, when the reporting type of MDT measurement data is real-time reporting, the method may further include:

(a) when a second UE performing the MDT in a previous PLMN moves to the current PLMN, judging, by the RNC/eNodeB, whether the second UE can continue to perform the MDT in the current PLMN;

where, the judging, by the RNC/eNodeB, whether the second UE can continue to perform the MDT in the current PLMN may specifically include: judging, by the RNC/eNodeB, whether the MDT PLMN List includes a home PLMN identity of the second UE or an equivalent PLMN identity of the second UE; and when the MDT PLMN List includes the home PLMN identity of the second UE or equivalent PLMN identity of the second UE, determining that the second UE can continue to perform the MDT in the current PLMN; otherwise, determining that the second UE cannot continue to perform the MDT in the current PLMN; and (b) when the second UE can continue to perform the MDT in the current PLMN, sending, by the radio network controller, a first MDT configuration message to the second UE to instruct the second UE to perform the MDT measurements.

Optionally, after (b) of the above embodiment, the method may further include the following contents.

(1) the RNC/eNodeB receives MDT measurement data reported by the second UE; and (2) the RNC/eNodeB sends the MDT measurement data to the corresponding TCE according to the address of the TCE.

Optionally, when the network element device is the CN, and the type of the MDT is signaling based MDT, the method further includes: when the first UE is a roaming user equipment, receiving, by the CN node, an MDT activation command sent by the OAM entity, where the MDT activation command carries a reporting type of MDT measurement data, an address of a TCE, an identity of the first UE, and a trace reference carrying an identity of the current PLMN; or when the first UE is a local user equipment, receiving, by the CN node, an MDT activation command sent by the HSS, where the MDT activation command is sent by the HSS after the HSS determines that the user intention of the first UE is to permit performing the MDT.

Further, when the network element device is the CN, and the type of the MDT is signaling based MDT, when the first UE is a roaming user equipment, the method may further include: acquiring, by the CN node, the user intention of the first UE from the HSS, and determining that the user intention of the UE is to permit performing the MDT.

Further, when the network element device is the CN, and the type of MDT is signaling based MDT, step 303 in the above embodiment may include: sending, by the CN node, the MDT activation command to the RNC/eNodeB, so that the RNC/eNodeB configures a first MDT configuration message according to the MDT activation command, and the RNC/eNodeB delivers the first MDT configuration message to the first UE to instruct the first UE to perform the MDT measurements.

When the network element device is the CN, and the type of MDT is signaling based MDT, the method in the above embodiment may further include:

(1) when a second UE performing the MDT in a previous PLMN moves to the current PLMN, receiving, by the CN node, a second MDT configuration message sent by a previous CN node corresponding to the previous PLMN;

(2) judging, by the CN node, whether the second UE can perform the MDT measurements in the current PLMN;

for example, the CN node may judge whether the MDT PLMN List includes a home PLMN identity or an equivalent home PLMN identity of the second UE; and when the MDT PLMN List includes the home PLMN identity or equivalent home PLMN identity of the second UE, determine that the second UE can perform the MDT measurements in the current PLMN; otherwise, determine that the second UE cannot perform the MDT measurements in the current PLMN; and (3) when determining that the second UE can perform the MDT measurements in the current PLMN, sending, by the CN node, the second MDT configuration message to the second UE through the RNC/eNodeB, so as to instruct the second UE to continue to perform the MDT.

Further, optionally, after (3), the method may further include:

(4) receiving, by the CN node, second MDT measurement data that is sent by the second UE through the RNC/eNodeB; and (5) sending, by the CN node, the second MDT measurement data to the previous CN node, so that the previous CN node sends the second MDT measurement data to the corresponding previous RNC/eNodeB, and the previous RNC/eNodeB sends the second MDT measurement data to the corresponding TCE.

When the network element device is the RNC/eNodeB, and the type of MDT is signaling based MDT, step 303 in the above embodiment may specifically be:

(a) receiving, by the RNC/eNodeB, an MDT activation command sent by the CN node, where the MDT activation command is sent by the OAM entity to the CN node, or is sent by the OAM entity to the HSS and sent by the HSS to the CN node when the HSS detects that the user intention of the first UE is to permit performing the MDT;

(b) configuring, by the RNC/eNodeB, a first MDT configuration message according to the MDT activation command; and (c) delivering, by the RNC/eNodeB, the first MDT configuration message to the first UE, so as to instruct the first UE to perform the MDT measurements.

Further, optionally, when the network element device is the RNC/eNodeB, and the type of the MDT is signaling based MDT, when the reporting type of MDT measurement data is real-time reporting, the method in the above embodiment further includes:

(1) when a second UE performing the MDT in a previous PLMN moves to the current PLMN, receiving, by the RNC/eNodeB, a second MDT configuration message sent by the CN node, where the second MDT configuration message sent by the CN node is received from a previous CN node corresponding to the previous PLMN;

(2) judging, by the RNC/eNodeB, whether the second UE can perform the MDT measurements in the current PLMN; and (3) when determining that the second UE can perform the MDT measurements in the current PLMN, sending, by the RNC/eNodeB, the second MDT configuration message to the second UE, so as to instruct the second UE to continue to perform the MDT.

Further, optionally, after (3), the method may further include:

(4) receiving, by the RNC/eNodeB, second MDT measurement data sent by the second UE; and (5) sending, by the RNC/eNodeB, the second MDT measurement data to the CN node, so that the CN node sends the second MDT measurement data to the previous CN node, and the previous CN node sends the second MDT measurement data to a corresponding previous RNC/eNodeB, so that the previous RNC/eNodeB sends the second MDT measurement data to a corresponding TCE.

Further, optionally, when the network element device is the RNC/eNodeB, and the type of the MDT is signaling based MDT, when the reporting type of MDT measurement data is non-real-time reporting, the configuring, by the RNC/eNodeB, the first MDT configuration message according to the MDT activation command, includes: configuring, by the RNC/eNodeB according to the MDT activation command, the first MDT configuration message carrying the address of the TCE and the trace reference.

Further, optionally, when the network element device is the RNC/eNodeB, and the reporting type of the MDT measurement data is non-real-time reporting, no matter whether the type of the MDT is signaling based MDT or management based MDT, the method in the above embodiment may further include the following contents.

(1) The RNC/eNodeB determines an area list for performing the MDT by the first UE.

For example, an area list for performing the MDT by the first UE may be determined in the following way:

(a) the RNC/eNodeB judges whether the current PLMN is the home PLMN or equivalent home PLMN of the first UE;

(b) when the current PLMN is the home PLMN or equivalent home PLMN of the first UE, the RNC/eNodeB determines that the area list for performing the MDT by the first UE is an MDT PLMN List; and (c) when the current PLMN is not the home PLMN or equivalent home PLMN of the first UE, the RNC/eNodeB determines that the area list for performing the MDT by the first UE includes an identity of the current PLMN, and the home PLMN identity and equivalent home PLMN identity of the first UE.

(2) The RNC/eNodeB configures, according to the trace session activation message, the first MDT configuration message carrying the address of the TCE, the trace reference, and the area list.

Further, optionally, when the network element device is the RNC/eNodeB, and the reporting type of the MDT measurement data is non-real-time reporting, no matter whether the type of the MDT is signaling based MDT or management based MDT, after (2), the method in the above embodiment may further include the following contents.

(a) when a second UE performing the MDT in a previous PLMN moves to the current PLMN, the RNC/eNodeB receives an indication sent by the second UE for reporting MDT measurement data;

(b) the RNC/eNodeB requests the MDT measurement data from the second UE;

(c) the RNC/eNodeB receives the MDT measurement data that is sent by the second UE and carries an identity of the TCE and an identity of the previous PLMN; and (d) when an interface exists between the RNC/eNodeB and a previous radio network controller or base station corresponding to the previous PLMN, the RNC/eNodeB sends the MDT measurement data to the previous radio network controller or base station according to the identity of the previous PLMN, so that the previous radio network controller or base station sends the MDT measurement data to the corresponding TCE according to the address of the TCE.

In the above embodiment, when no interface exists between the RNC/eNodeB and the previous radio network controller or base station corresponding to the previous PLMN, the RNC/eNodeB may send the MDT measurement data to the CN node corresponding to the current PLMN, so that the CN node sends the MDT measurement data to the previous PLMN according to the identity of the previous PLMN in the MDT measurement data, and the previous PLMN sends the MDT measurement data to the corresponding previous radio network controller or base station, so that the previous radio network controller or base station sends the MDT measurement data to the corresponding TCE according to the address of the TCE.

Any combination of the above multiple optional embodiments included in the MDT control method in the embodiment of the present invention may constitute an optional embodiment of the present invention. The following embodiments in FIG. 5A and FIG. 5B to FIG. 12A and FIG. 12B respectively describe in detail the technical solutions of FIG. 1 and extended embodiments.

By using the above MDT control method in the above embodiment, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 4:
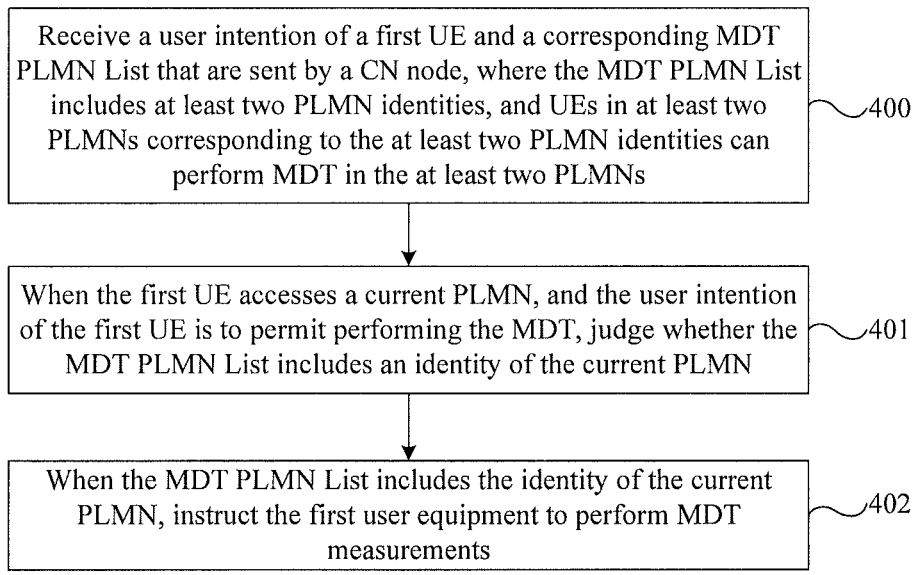
FIG. 4 is a flowchart of an MDT control method according to another embodiment of the present invention.

FIG. 4 is a flowchart of an MDT control method according to another embodiment of the present invention. As shown in FIG. 4, the MDT control method in this embodiment is executed by an RNC or an eNodeB. The MDT control method in this embodiment may include the following contents.

400. Receive a user intention of a first UE and a corresponding MDT PLMN List that are sent by a CN node, where the MDT PLMN List includes at least two PLMN identities, and UEs in at least two PLMNs corresponding to the at least two PLMN identities can perform MDT in the at least two PLMNs.

401. When the first UE accesses a current PLMN, and the user intention of the first UE is to permit performing the MDT, judge whether the MDT PLMN List includes an identity of the current PLMN.

402. When the MDT PLMN List includes the identity of the current PLMN, instruct the first user equipment to perform MDT measurements.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Optionally, in the embodiment shown in FIG. 4, the user intention of the first UE and the corresponding MDT PLMN List that are sent by the CN node are acquired from an HSS.

It should be noted that the embodiment shown in FIG. 4 is similar to the embodiment shown in FIG. 3 except that steps 401 and 302 are different. For details, reference may be made to the description of the embodiment shown in FIG. 3, which is not further described herein.

It should be noted that the MDT PLMN List in this embodiment, as subscription information of a user, is configured in the HSS. Further, the MDT control method in this embodiment may also include management based MDT measurements and signaling based MDT measurements, and the reporting type of MDT measurement data includes two types: real-time reporting and non-real-time reporting. For the RNC or eNodeB, it is necessary to determine that the user intention of the UE is to permit performing the MDT, and determine that the MDT PLMN List of the UE includes the identity of the current PLMN to instruct the UE to perform MDT measurements. The remaining detailed implementation processes are similar to those in the extended embodiments of the method shown in FIG. 1, and are not further described herein. The following embodiments in FIG. 13A and FIG. 5B to FIG. 16A and FIG. 16B respectively describe in detail the technical solutions of FIG. 4 and extended embodiments.

Figure 5A:
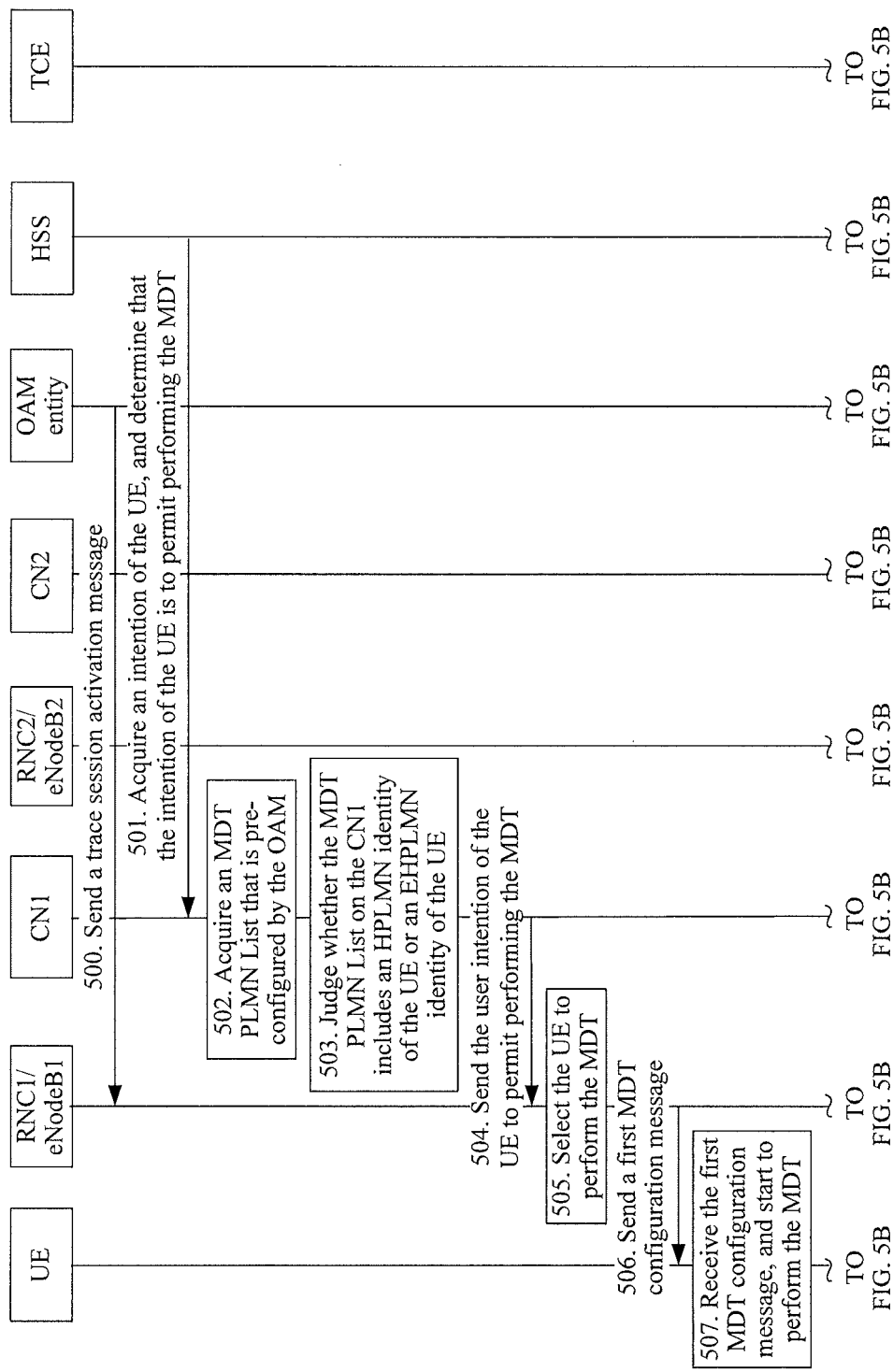
FIG. 5A and FIG. 5B are a signaling flowchart diagram of an MDT control method according to another embodiment of the present invention.
Figure 5B:
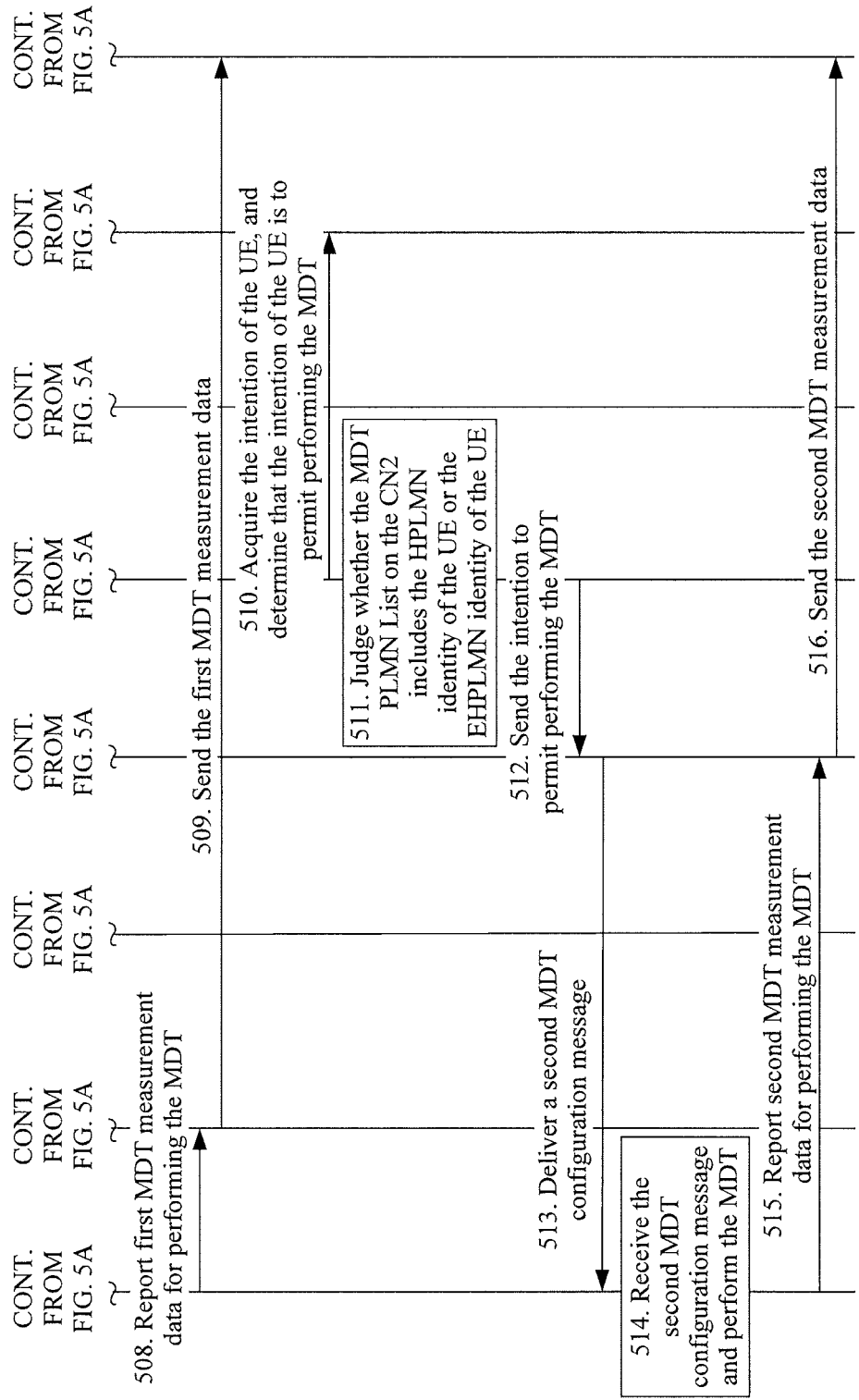

FIG. 5A and FIG. 5B are a signaling diagram of an MDT control method according to an embodiment of the present invention. In the MDT control method in this embodiment, the technical solution of the present invention is described in detail by using an example where the type of the MDT is management based the MDT, the reporting type of MDT measurement data is real-time reporting, and an MDT PLMN List is configured on a CN. As shown in FIG. 5A and FIG. 5B, the MDT control method in this embodiment may specifically include the following contents.

500. When a UE accesses a PLMN1, an OAM entity sends a trace session activation message to an RNC1/eNodeB1.

The trace session activation message carries configuration information such as a TR, a reporting type of MDT measurement data, and an IP address of a TCE. The TR carries an identity of the current PLMN1, and the reporting type of the MDT measurement data is real-time reporting.

Optionally, the trace session activation message may further include an MDT data collection area, where the MDT data collection area may be cell information, routing area information, location area information, and/or a PLMN List to be measured, for example, the MDT PLMN List includes a PLMN1/2/3, but the OAM may specify that MDT is performed in only the PLMN1 and PLMN2. The MDT data collection area is definitely in the scope of each PLMN corresponding to each PLMN identity in the MDT PLMN List configured by the OAM on the RNC1/eNodeB1. When the trace session message does not carry the MDT data collection area, the default MDT data collection area is in the scope of the PLMNs corresponding to the PLMN identities included in the whole MDT PLMN List. This embodiment and the following FIG. 6A and FIG. 6B to FIG. 16A and FIG. 16B all use the default MDT data collection area as an example.

501. The CN1 acquires an intention of the UE from an HSS, and determines that the intention of the UE is to permit performing the MDT.

Otherwise, if the CN1 acquires an intention of the UE from the HSS, and determines that the intention of the UE is not to permit performing the MDT, the procedure ends.

502. The CN1 acquires, from the CN1, an MDT PLMN List that is pre-configured on the CN 1 by the OAM.

The MDT PLMN List may be configured based on a PLMN, and may also be configured based on a UE group having a common feature. For example, when an MDT PLMN List is configured based on a PLMN, if the CN1 belongs to one PLMN, only one MDT PLMN List is configured for the PLMN; if the CN1 belongs to multiple PLMNs (for example, it belongs to the PLMN1 and PLMN11, for the scenario of CN sharing), an MDT PLMN List is configured for the PLMN1 and PLMN11 respectively. When an MDT PLMN List is configured based on a UE group having a common feature, multiple MDT PLMN Lists may be configured on the CN1.

It should be noted that steps 500, 501, and 502 may be performed in any sequence.

503. The CN1 judges whether the MDT PLMN List on the CN1 includes an HPLMN identity of the UE or an EHPLMN identity of the UE.

When the MDT PLMN List includes the HPLMN identity or EHPLMN identity of the UE, the CN1 transfers the intention of the UE to an RNC1/eNodeB1 accessed by the user. Then the procedure goes on to step 504. Otherwise, the procedure ends.

In step 503, every time when the UE accesses the target RNC1/eNodeB1, the CN needs to rejudge whether it is necessary to deliver the intention of the UE to the RNC1/eNodeB1. For example, for an LTE system, after the UE performs an inter-PLMN X2 HO, the CN needs to rejudge whether it is necessary to deliver the user intention to the target RNC1/eNodeB1.

The HPLMN identity of the UE may be acquired from the IMSI of the UE, and the EHPLMN identity of the UE may be acquired from the HSS, and may also be acquired from the UE side. For example, the EHPLMN identity of the UE may be acquired by the CN1 from the UE through an identity request/response (Identity Request/Response) process, and may also be actively reported by the UE when the UE accesses the network.

504. The CN1 sends, to the RNC1/eNodeB1 accessed by the UE, the user intention of the UE to permit performing the MDT, so as to indicate that the UE may be selected to perform the MDT.

505. The RNC1/eNodeB1 selects the UE to perform the MDT.

506. The RNC1/eNodeB1 sends a first MDT configuration message to the UE.

The first MDT configuration message is configured by the RNC1/eNodeB1 according to each piece of configuration information in the trace session activation message that is received from the OAM entity in step 500. In this embodiment, the reporting type of management based MDT measurements and MDT measurement data is real-time reporting and the first MDT configuration message may not include the TR and TCE ID.

507. The UE receives the first MDT configuration message, and starts to perform the MDT.

508. When a reporting condition is satisfied, the UE reports first MDT measurement data to the RNC1/eNodeB1.

509. The RNC1/eNodeB1 receives the first MDT measurement data, and sends the first MDT measurement data to the corresponding TCE according to the IP address of the TCE.

When the UE moves to another PLMN2 from the PLMN1, assuming that the UE accesses an RNC2 in a CN2 corresponding to the PLMN2, or the UE accesses the PLMN2 but the CN node does not change (for the scenario where a CN node is shared, that is, a same CN node belongs to multiple PLMNs), for ease of subsequent description, as long as the PLMN accessed by the UE changes, even if the CN does not change, the CN node is also called CN2. Further, the following steps may be included:

510. When the RNC2/eNodeB2 detects that the UE accesses the PLMN2, the CN2 acquires the intention of the UE from the HSS, and determines that the intention of the UE is to permit performing the MDT. For details, reference may be made to step 701.

511. The CN2 judges whether the MDT PLMN List on the CN2 includes the HPLMN identity of the UE or the EHPLMN identity of the UE; and if yes, determines that the UE can continue to perform the MDT in the PLMN2; otherwise, determines that the UE cannot continue to perform the MDT in the PLMN2.

512. When determining that the UE can continue to perform the MDT in the PLMN2, the CN2 delivers, to the RNC2/eNodeB2, the intention of the UE to permit performing the MDT, so as to notify the RNC2/eNodeB that the UE can continue to perform the MDT.

For the process of acquiring the HPLMN identity of the UE or the EHPLMN identity of the UE, reference may be made to the foregoing acquiring of the HPLMN identity of the UE or the EHPLMN identity of the UE, which is not further described. In addition, the CN2 may acquire the HPLMN and EHPLMN list of the UE from the CN1.

513. The RNC2/eNodeB2 delivers a second MDT configuration message to the UE.

It should be noted that same as step 500, the OAM may also send a trace session activation message to the RNC2/eNodeB2. Similar to the first MDT configuration message, the second MDT configuration message is configured by the RNC2/eNodeB2 according to the received trace session activation message.

514. The UE receives the second MDT configuration message delivered by the RNC2/eNodeB2, and performs the MDT.

515. When a reporting condition is satisfied, the UE reports second MDT measurement data to the RNC2/eNodeB2.

516. The RNC2/eNodeB2 sends the second MDT measurement data to the corresponding TCE according to the address of the TCE.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the home PLMN of the home network where the UE is currently registered, so that the UE can continue to perform MDT measurements after the UE moves to another PLMN.

Figure 6A:
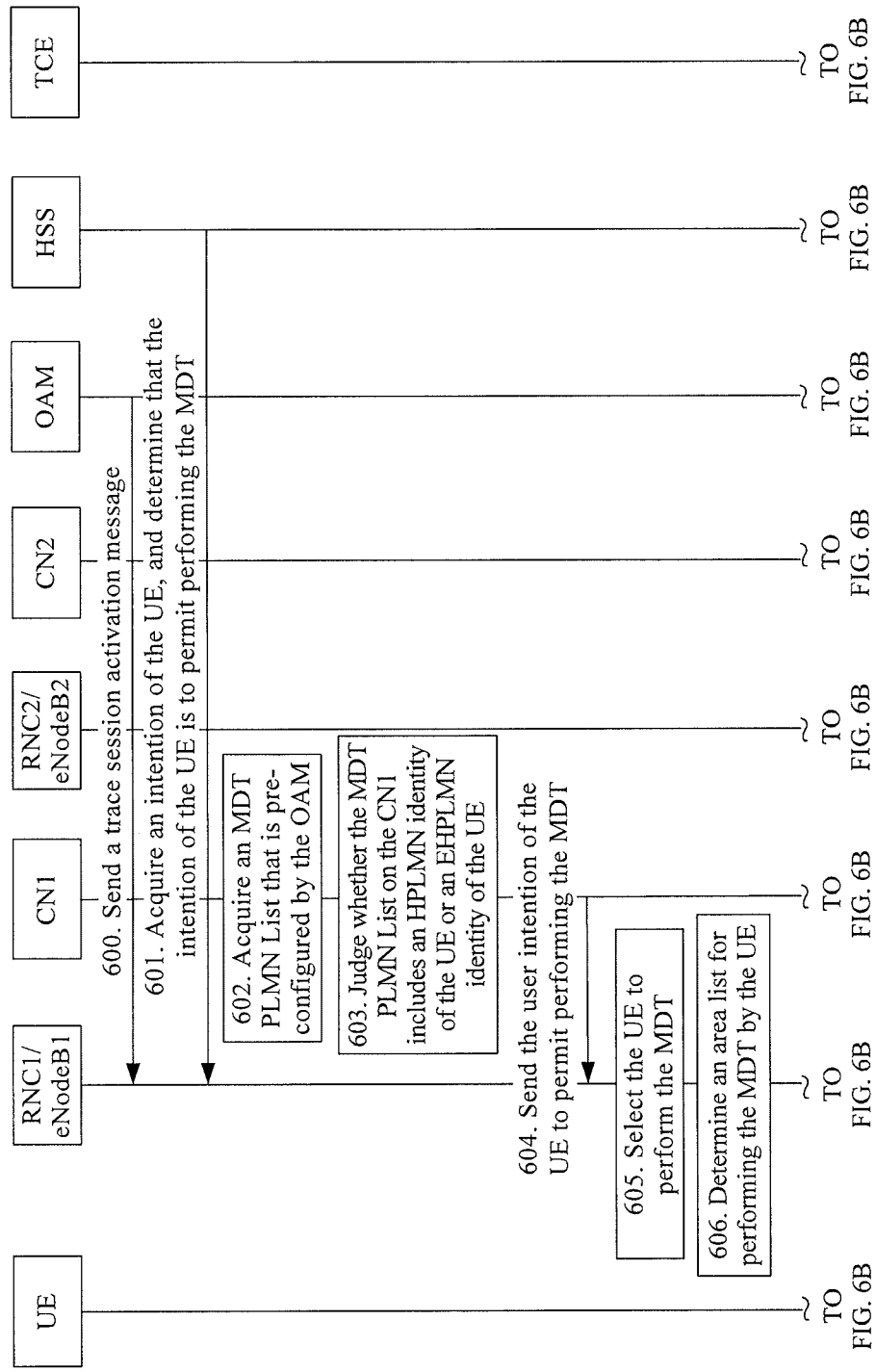
FIG. 6A and FIG. 6B are a signaling diagram of an MDT control method according to another embodiment of the present invention.
Figure 6B:
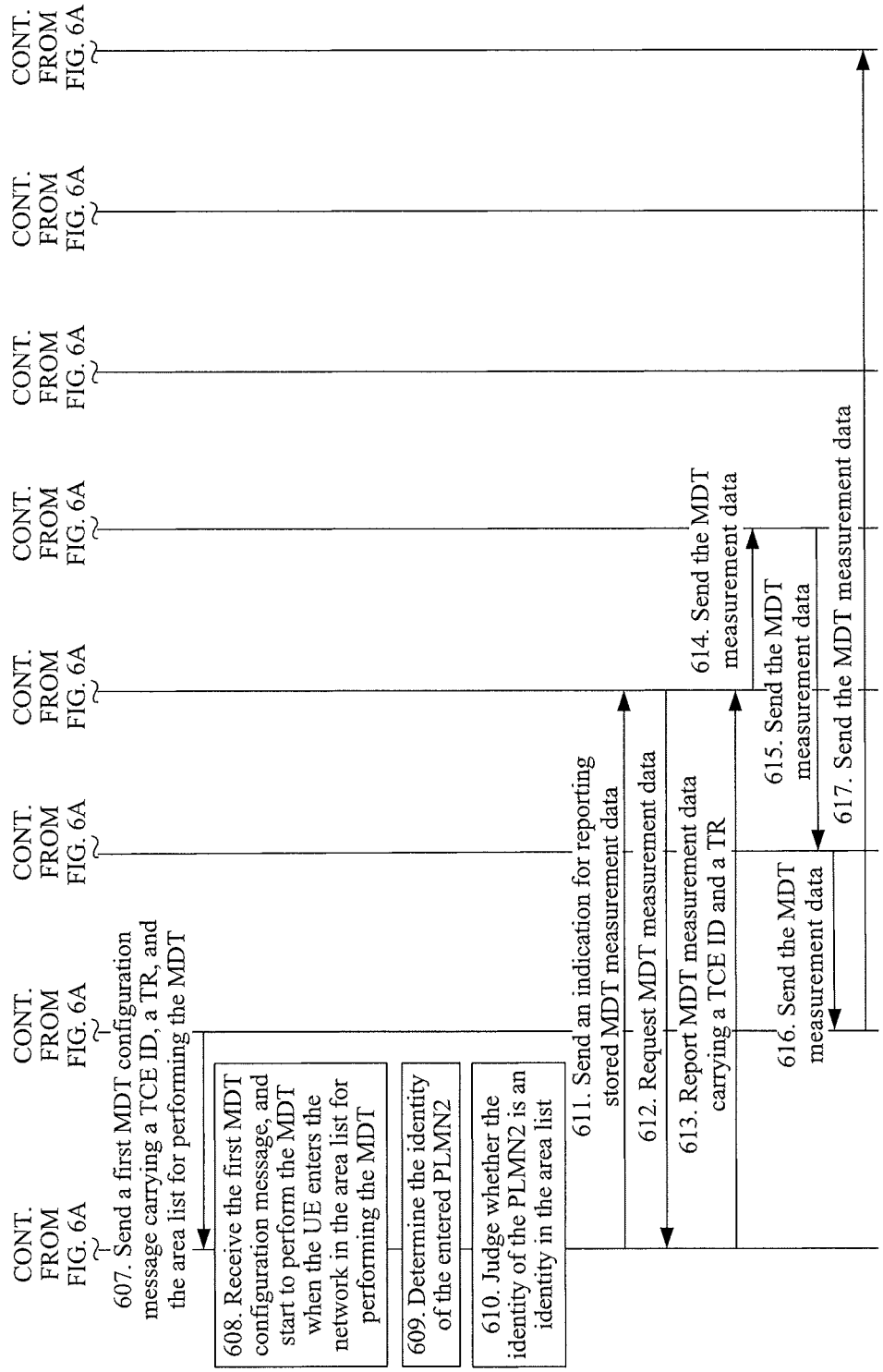

FIG. 6A and FIG. 6B are a signaling diagram of an MDT control method according to another embodiment of the present invention. In the MDT control method in this embodiment, the technical solution of the present invention is described in detail by using an example where the type of the MDT is management based the MDT, the reporting type of MDT measurement data is non-real-time reporting, and an MDT PLMN List is configured on a CN. As shown in FIG. 6A and FIG. 6B, the MDT control method in this embodiment may specifically include the following contents.

Steps 600 to 605 are the same as steps 500 to 505 in the above embodiment, except that the reporting type of MDT measurement data is non-real-time reporting. For details, reference may be made to the description of the above embodiment, which is not further described herein.

606. The RNC1/eNodeB1 determines an area list for performing the MDT by the UE.

Herein the area list for performing the MDT may also be regarded as an MDT data collection area. If the MDT configuration configured by the OAM for the RNC1/eNodeB1 includes specific area information (for example, a list of measured cells), measurements are performed according to the specified area; if specific area information is not included, the area for performing the MDT may be determined in the following way: specifically, judging whether the current PLMN is the HPLMN or EHPLMN of the UE, and if yes, determining that the area list for performing the MDT is an MDT PLMN List; otherwise, when determining that the current PLMN is not the PLMN or EHPLMN of the UE, determining that the area list for performing the MDT includes the current PLMN of the UE and the HPLMN of the UE and the EHPLMN of the UE. Before step 606, the CN1 needs to first send the MDT PLMN List to the RNC1/eNodeB1.

607. The RNC1/eNodeB1 sends a first MDT configuration message carrying a TCE ID, a TR, and the area list for performing the MDT to the UE.

Similar to step 506 in the above embodiment, the first MDT configuration message is also configured by the RNC1/eNodeB1 according to each piece of configuration information in the trace session activation message received from the OAM entity. However, in this embodiment, the type of the MDT is management based the MDT, the reporting type of MDT measurement data is non-real-time reporting and the first MDT configuration message must include the TR and TCE ID. Optionally, the first MDT configuration message may further include an area list, which is used as an example herein.

608. The UE receives the first MDT configuration message, and starts to perform the MDT when the UE enters the network in the area list for performing the MDT.

Optionally, it also be that step 606 is not performed (according to the optional solution, step 607 does not include an area list for performing the MDT). After the MDT PLMN List is acquired in step 602, in the process such as the home network attach, location area update, or routing area update process of the UE, the CN1 delivers the MDT PLMN List to the UE, and controls the area for performing the MDT at the UE side. For example, the UE may first judge whether the current PLMN is an HPLMN or EHPLMN of the UE, and if yes, it is determined that the UE is a local user equipment; in this case, by default, the UE performs the MDT in the PLMN corresponding to the PLMN identity in the MDT PLMN List. If the UE determines that the current PLMN is not the HPLMN or EHPLMN of the UE, it is determined that the UE is a roaming user equipment; in this case, by default, the UE can only perform the MDT in the scopes of the PLMN1 and/or HPLMN of the UE and the EHPLMN of the UE.

609. After the UE performing the MDT enters a PLMN2 from the current PLMN1, the UE determines the identity of the entered PLMN2.

For example, the UE may determine the entered PLMN2 according to the received system information of the PLMN2.

610. When the UE enters an active state (for example, a CELL-DCH/CELL-FACH state in a UMTS system, and a connected state in an LTE system), the UE judges whether the identity of the PLMN2 is an identity in the area list.

When the identity of the PLMN2 is an identity in the area list, the following step 611 is performed; otherwise, the procedure ends.

Optionally, when the UE determines that the identity of the PLMN2 is an identity in the area list, further, the UE may further judge whether "a PLMN List for permitting continuing to perform the MDT" in the system information delivered by the RNC2/eNodeB2 includes the PLMN1 corresponding to the TR of the MDT task, and if yes, the UE may continue to perform the MDT in the PLMN2.

611. The UE sends, to the RNC2/eNodeB2 corresponding to the PLMN2, an indication for reporting stored MDT measurement data.

612. The RNC2/eNodeB2 requests MDT measurement data from the UE.

613. The UE reports MDT measurement data carrying a TCE ID and a TR to the RNC2/eNodeB2.

614. The RNC2/eNodeB2 sends the MDT measurement data to the corresponding CN2.

615. The CN2 sends the MDT measurement data to the corresponding CN1 according to the identity of the PLMN1 in the TR.

For example, in the UMTS, the RNC2/eNodeB2 may send the MDT measurement data to the CN2 through a direct information transfer (DIRECT INFORMATION TRANSFER) message, and then the CN2 forwards the MDT measurement data, through the DIRECT INFORMATION TRANSFER message, to the RNC corresponding to the CN2. Specifically, forwarding may be triggered in multiple manners, for example, real-time forwarding may be performed, that is, the MDT measurement data is forwarded every time when the MDT measurement data of one UE is received; or forwarding is triggered by an event, for example, the MDT measurement data is forwarded every time when MDT measurement data of N UEs is received, on the premise that the N pieces of MDT data are all sent to a same CN2; for another example, forwarding may be triggered by a timer, that is, if the RNC2 stores MDT data, the MDT data is forwarded at an interval of time.

616. The CN1 sends the MDT measurement data to the corresponding RNC1/eNodeB1.

An optional solution of steps 614, 615, and 616 is: The RNC2/eNodeB2 transfers the MDT measurement data through an Iur interface (an interface between the RNC1 and the RNC2) or an X2 interface (an interface between the eNodeB1 and the eNodeB2) to the RNC1/eNodeB1 corresponding to the TR. A premise of the solution is that an Iur or X2 interface exists between the RNC2/eNodeB2 and the RNC1/eNodeB1 corresponding to the TR.

In an actual application, the CN1 may also not send the MDT measurement data to the RNC1/eNodeB1, as long as is the PLMN is the PLMN1 corresponding to the RNC1/eNodeB1.

617. The RNC1/eNodeB1 acquires the corresponding the IP address of the TCE according to the TCE ID in the MDT measurement data, and sends the MDT measurement data to the TCE corresponding to the TCE IP.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 7A:
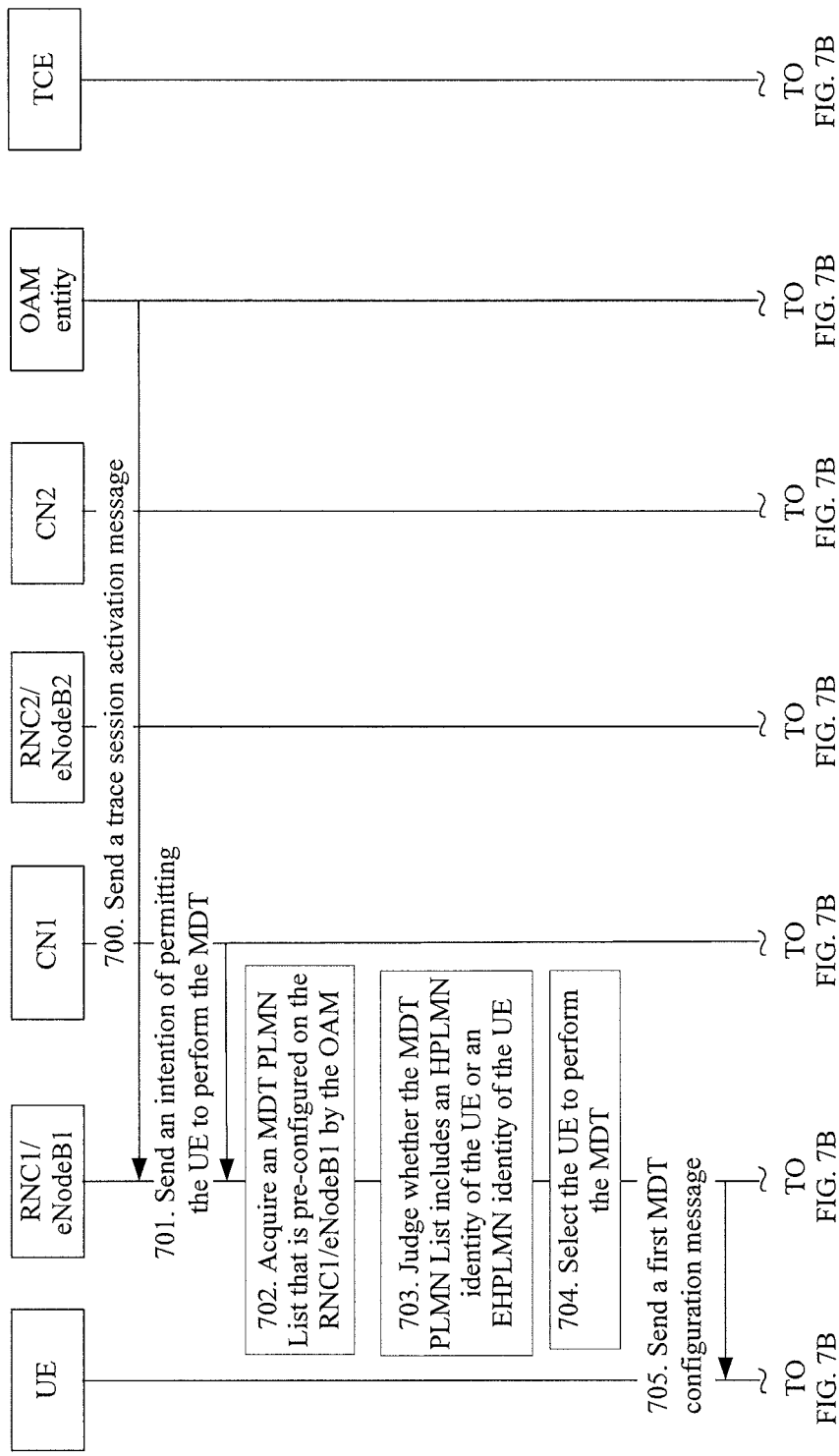
FIG. 7A and FIG. 7B are a signaling diagram of an MDT control method according to another embodiment of the present invention.
Figure 7B:
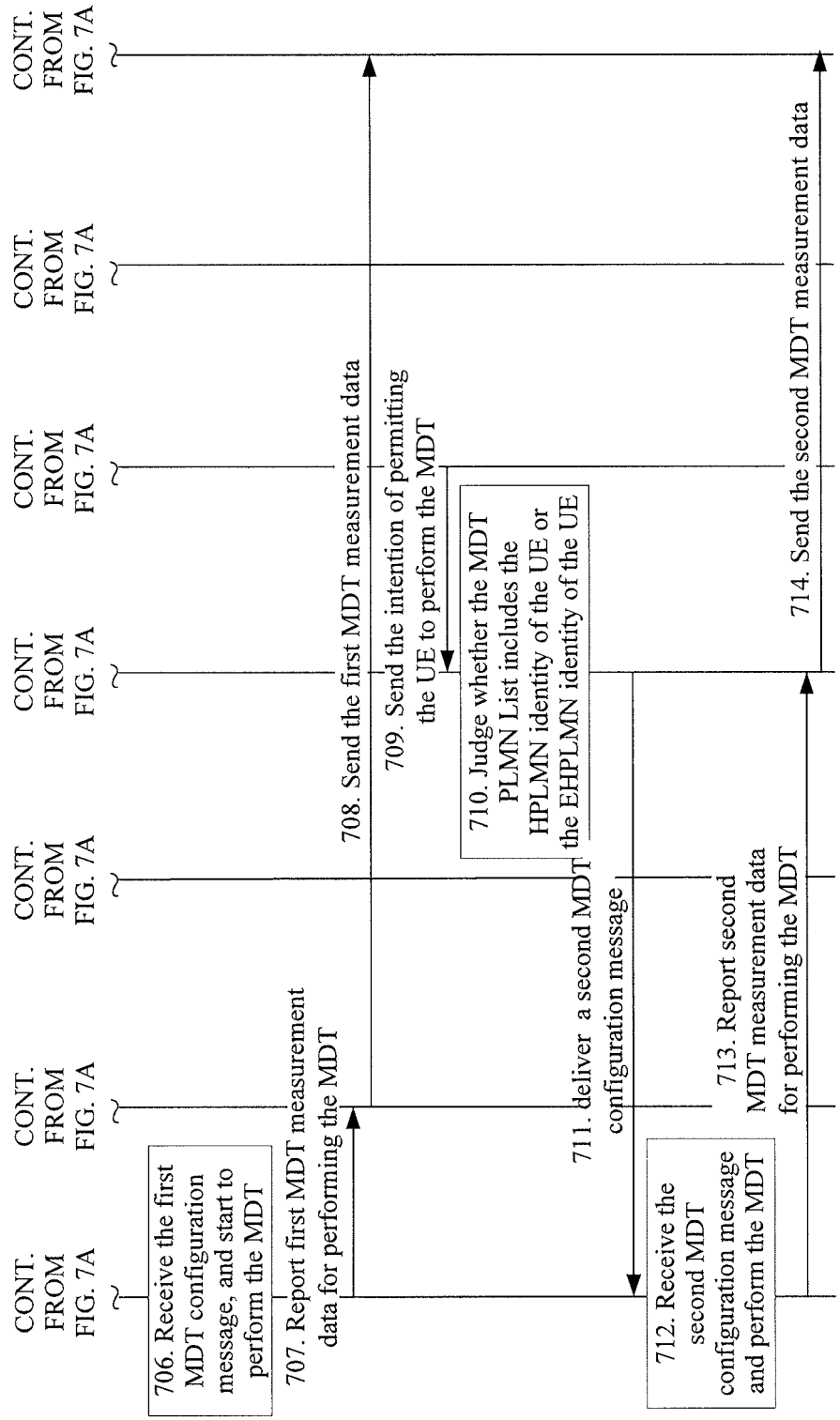

FIG. 7A and FIG. 7B are a signaling diagram of an MDT control method according to another embodiment of the present invention. In the MDT control method in this embodiment, the technical solution of the present invention is described in detail by using an example where the type of the MDT is management based the MDT, the reporting type of MDT measurement data is real-time reporting and an MDT PLMN List is configured on an RNC. As shown in FIG. 7A and FIG. 7B, the MDT control method in this embodiment may specifically include the following contents.

Step 700 is the same as step 500. For details, reference may be made to the description of the above embodiment, which is not further described herein.

701. The RNC1/eNodeB1 receives an user intention of the UE to permit permitting the MDT, which is sent by the CN1.

Specifically, the CN1 may acquire the intention of the UE from the HSS. When the intention of the UE is to permit performing the MDT, the CN1 sends the intention of permitting the UE to perform the MDT to the RNC1/eNodeB1; otherwise, when the intention of the UE is not to permit the MDT, the CN1 does not send a message to the RNC1/eNodeB1, and the procedure ends.

702. The RNC1/eNodeB1 acquires, from the RNC1/eNodeB1, an MDT PLMN List that is pre-configured on the RNC1/eNodeB1 by the OAM.

The MDT PLMN List is the same as that in step 502 in the embodiment shown in FIG. 5A and FIG. 5B. For details, reference may be made to the description of the above embodiment, which is not further described herein.

703. The RNC1/eNodeB1 judges whether the MDT PLMN List includes an HPLMN identity of the UE or an EHPLMN identity of the UE.

When the MDT PLMN List includes the HPLMN identity or EHPLMN identity of the UE, it is determined that the UE may be selected to perform the MDT. Then the procedure goes on to step 704. Otherwise, the procedure ends.

Step 703 is the same as step 503, except that the execution body changes to the RNC1/eNodeB1. For details, reference may be made to the description of the above embodiment, which is not further described herein.

Steps 704 to 708 are the same as steps 505 to 509 in the embodiment shown in FIG. 5A and FIG. 5B. For details, reference may be made to the description of the above embodiment, which is not further described herein.

Optionally, when steps 707 and 708 are not performed, and the UE moves to another PLMN2 from the current PLMN1, assuming that the UE accesses the RNC2 in the CN2 corresponding to the PLMN, the method may further include the following steps:

709. The RNC2/eNodeB2 receives the intention of permitting the UE to perform the MDT, which is sent by the CN2; for details, reference may be made to step 701.

710. The RNC2/eNodeB2 judges whether the MDT PLMN List on the RNC2/eNodeB2 includes the HPLMN identity of the UE or the EHPLMN identity of the UE; and if yes, determines that the UE can continue to perform the MDT in the PLMN2; otherwise, determines that the UE cannot continue to perform the MDT in the PLMN2.

For the process of acquiring the HPLMN identity of the UE or the EHPLMN identity of the UE, reference may be made to the foregoing acquiring of the HPLMN identity of the UE or the EHPLMN identity of the UE, which is not further described herein.

711. When it is determined that the UE can continue to perform the MDT in the PLMN2, the RNC2/eNodeB2 delivers a second MDT configuration message to the UE.

The second configuration message is configured by the RNC2/eNodeB2 according to the trace session activation message that is sent by the OAM entity. For details, reference may be made to the related description of the embodiment shown in FIG. 5A and FIG. 5B.

Steps 712 to 714 are the same as steps 514 to 516 in the embodiment shown in FIG. 5A and FIG. 5B. For details, reference may be made to the description of the above embodiment, which is not further described herein.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 8A:
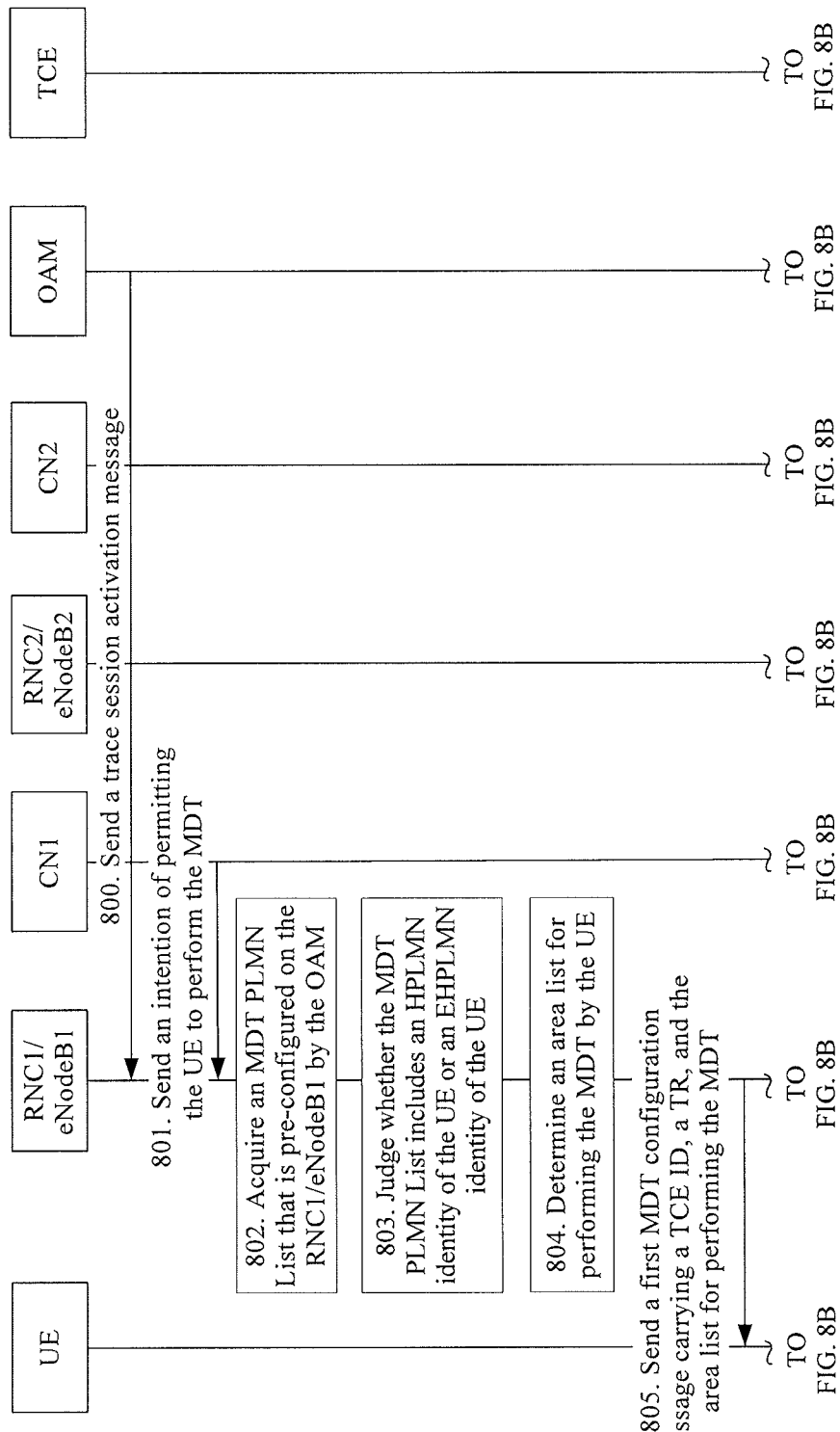
FIG. 8A and FIG. 8B are a signaling diagram of an MDT control method according to another embodiment of the present invention.
Figure 8B:
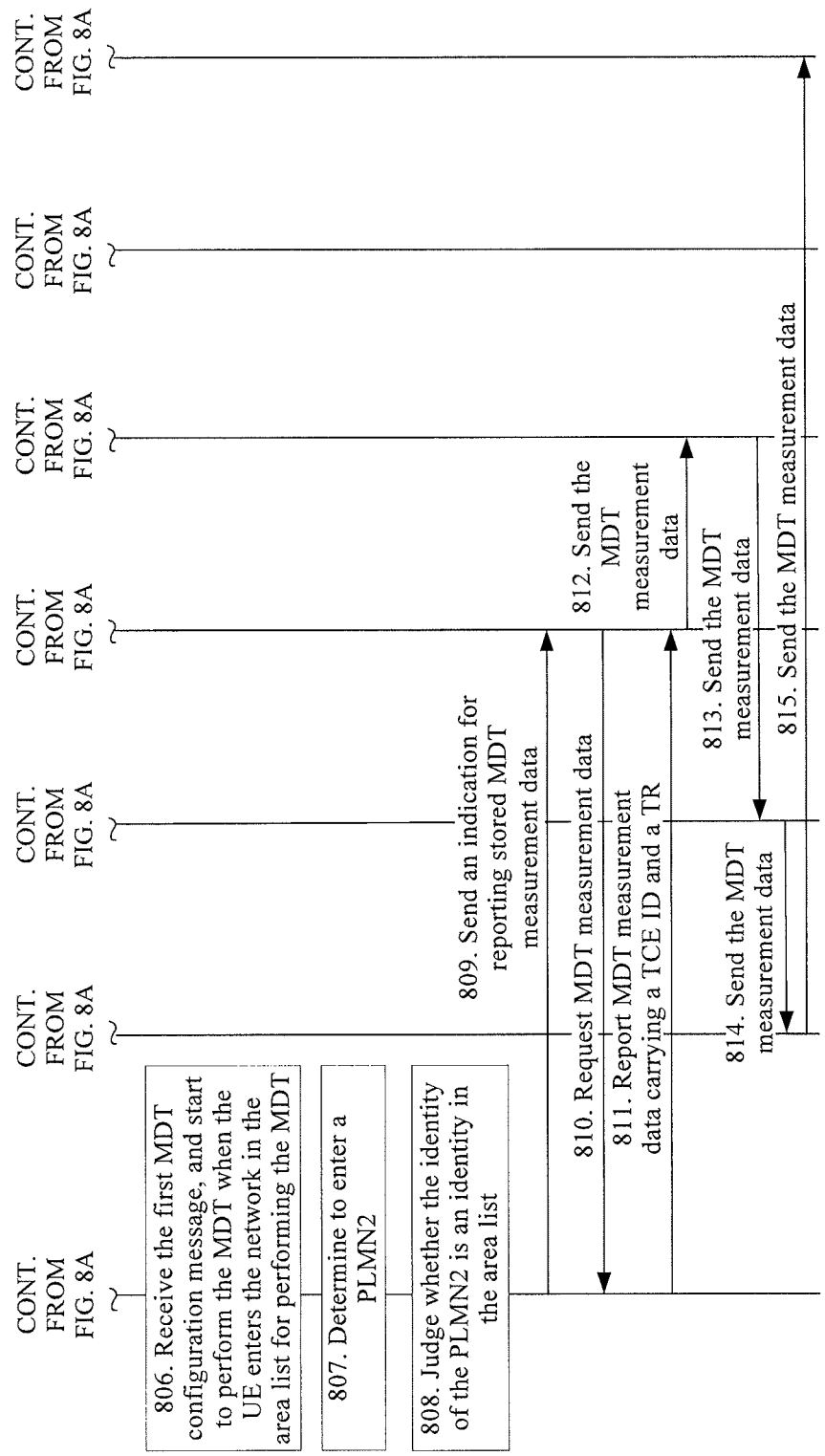

FIG. 8A and FIG. 8B are a signaling diagram of an MDT control method according to another embodiment of the present invention. In the MDT control method in this embodiment, the technical solution of the present invention is described in detail by using an example where the type of the MDT is management based the MDT, the reporting type of MDT measurement data is non-real-time reporting and an MDT PLMN List is configured on an RNC. As shown in FIG. 8A and FIG. 8B, the MDT control method in this embodiment may specifically include the following contents.

Step 800 is the same as step 600 shown in FIG. 6A and FIG. 6B, and is not further described herein. For details, reference may be made to the description of the above embodiment.

Steps 801 to 803 are the same as steps 701 to 703 in the embodiment shown in FIG. 7A and FIG. 7B. For details, reference may be made to the description of the above embodiment, which is not further described herein.

Step 804 is the same as step 606 in the embodiment shown in FIG. 6A and FIG. 6B. For details, reference may be made to the description of the above embodiment, which is not further described herein.

Steps 805 to 815 are the same as steps 606 to 617 in the embodiment shown in FIG. 6A and FIG. 6B. For details, reference may be made to the description of the above embodiment, which is not further described herein.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 9A:
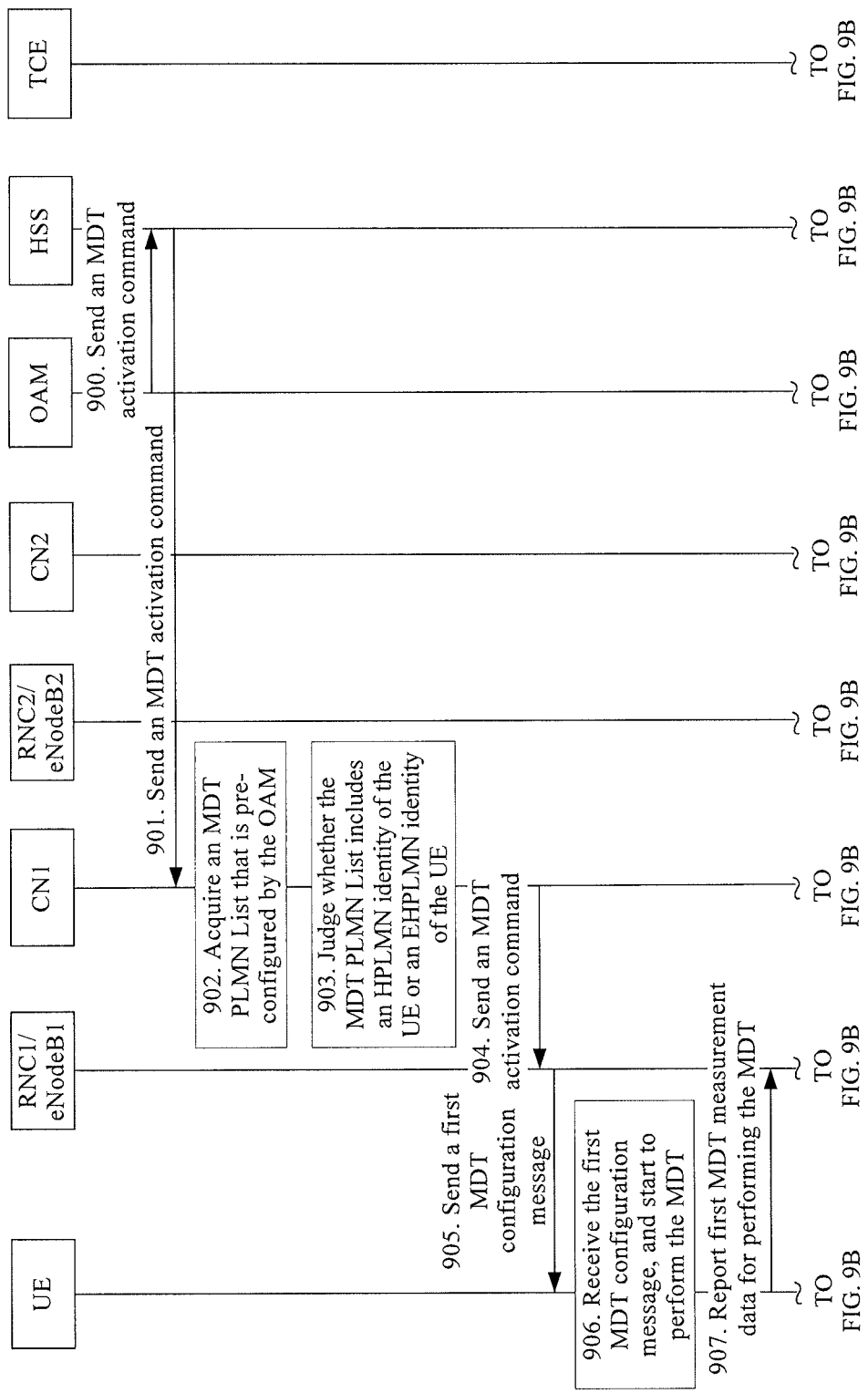
FIG. 9A and FIG. 9B are a signaling diagram of an MDT control method according to another embodiment of the present invention.
Figure 9B:
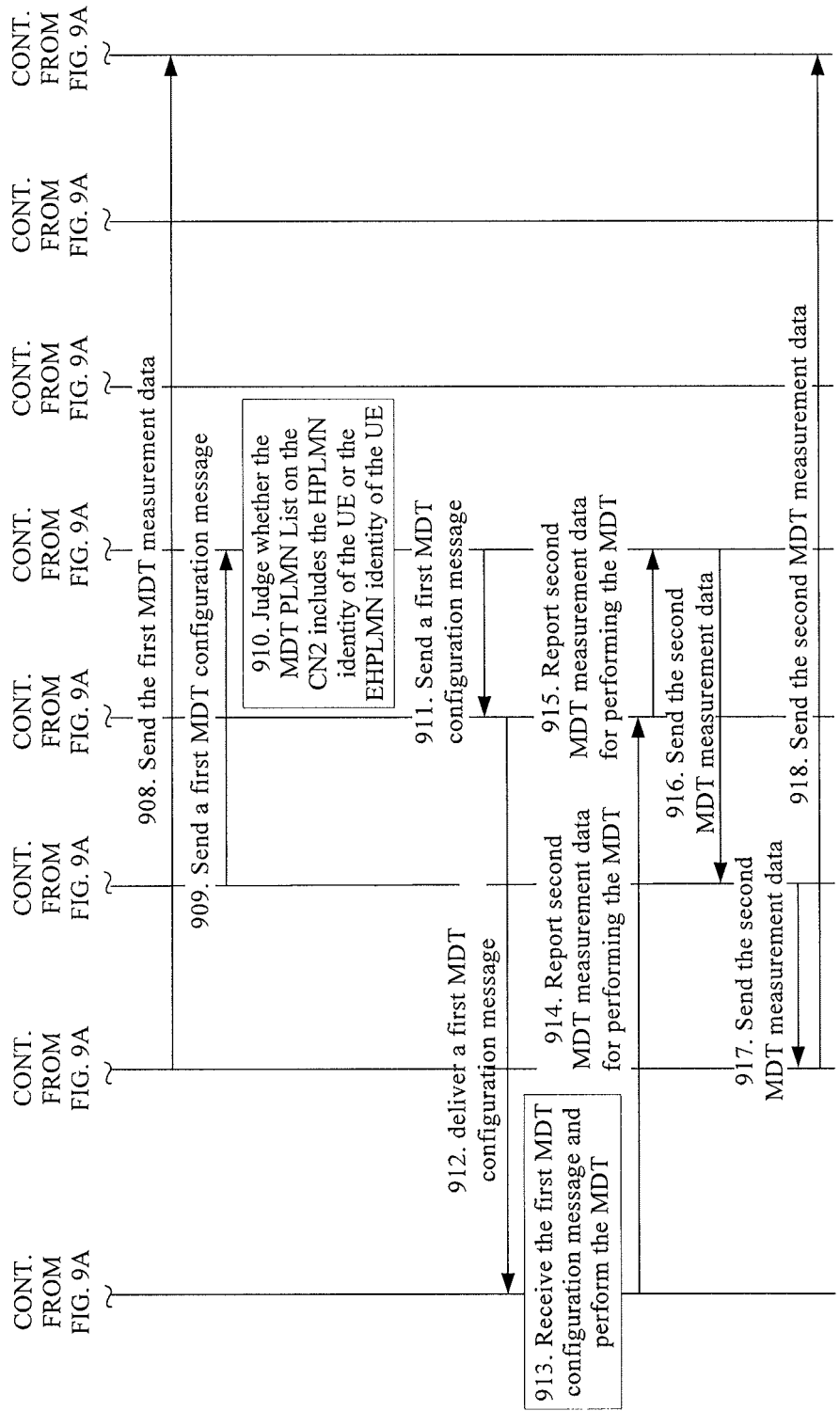

FIG. 9A and FIG. 9B are a signaling diagram of an MDT control method according to another embodiment of the present invention. In the MDT control method in this embodiment, the technical solution of the present invention is described in detail by using an example where the type of the MDT is signaling based MDT, the reporting type of MDT measurement data is real-time reporting and an MDT PLMN List is configured on a CN. As shown in FIG. 9A and FIG. 9B, the MDT control method in this embodiment may specifically include the following contents.

900. When a UE accesses a current PLMN1, an OAM entity sends an MDT activation command to an HSS.

When the OAM entity specifies that the UE performs MDT, the MDT activation command carries configuration information such as an identity of the UE (which specifically may be an IMSI of the UE), a TR, a reporting type of MDT measurement data, and an IP address of a TCE. The TR carries an identity of the current PLMN, and the reporting type of the MDT measurement data is non-real-time reporting. Optionally, the MDT activation command may further carry an MDT data collection area. For details, reference may be made to the related description of the embodiment shown in FIG. 5A and FIG. 5B, which is not further described herein.

901. The HSS searches to determine whether a stored intention of the UE is to permit performing the MDT, and when the intention of the UE is to permit performing the MDT, the HSS sends an MDT activation command to a CN1; otherwise, the procedure ends.

If it is specified that the UE performs the MDT in a visited network, the HSS is not required. In addition, the OAM in the visited network directly sends an MDT activation command to the CN node, and the CN determines, by acquiring the intention of the UE from the HSS or a source CN node, whether the user intention of the UE is to permit performing the MDT. It should be noted that the OAM can determine whether the user is a local user equipment or a roaming user equipment according to the IMSI.

Steps 902 and 903 are the same as steps 502 and 503 in the embodiment shown in FIG. 5A and FIG. 5B. For details, reference may be made to the description of the above embodiment, which is not further described herein.

904. The CN1 sends an MDT activation command to the corresponding RNC1/eNodeB1.

905. The RNC1/eNodeB1 sends a first MDT configuration message to the corresponding UE.

The first MDT configuration message in this embodiment is configured according to the MDT activation command. This embodiment is described by using an example where the type of the MDT is signaling based the MDT, the reporting type of MDT measurement data is real-time reporting and the first MDT configuration message may not include the TR and TCE ID.

Steps 906 to 908 are the same as steps 507 to 509 in the embodiment shown in FIG. 5A and FIG. 5B. For details, reference may be made to the description of the above embodiment, which is not further described herein.

When the UE moves to another PLMN2 from the current PLMN1, assuming that the UE accesses an RNC2 in a CN2 corresponding to the PLMN, the method may further include the following steps:

909. When the CN1 detects that the UE enters the PLMN2 from the PLMN1, the CN1 sends a first MDT configuration message to the CN2 corresponding to the PLMN2.

Specifically, for example, in the relocation (relocation) of the UMTS or after completion of the relocation, the CN1 forwards the MDT configuration message to the CN2 (this step does not exist because a same CN node is used in the current scenario of CN sharing); for LTE system, in the handover process or after completion of the handover, the CN1 forwards the MDT configuration message to the CN2.

910. The CN2 judges whether the MDT PLMN List on the CN2 includes the HPLMN identity of the UE or the EHPLMN identity of the UE; and if yes, determines that the UE can continue to perform the MDT in the PLMN2; otherwise, determines that the UE cannot continue to perform the MDT in the PLMN2.

911. When determining that the UE can continue to perform the MDT in the PLMN2, the CN2 sends the first MDT configuration message to the RNC2/eNodeB2 accessed by the UE.

The specific implementation may be: for example, after the relocation of the UMTS, the CN2 resends a CN INVOKE TRACE message to the RNC2 to trigger the MDT task to continue; in the handover process of the LIE system through S1 (an interface between the eNodeB and the MME), the CN2 forwards the MDT configuration message to the eNodeB; after an X2 (an interface between eNodeBs), the MME reinitiates a Trace Start process to trigger the MDT task to continue.

912. The RNC2/eNodeB2 delivers the first MDT configuration message to the UE.

913. The UE receives the first MDT configuration message delivered by the RNC2/eNodeB2, and performs the MDT.

914. When a reporting condition is satisfied, the UE reports second MDT measurement data, to the RNC2/eNodeB2.

915. The RNC2/eNodeB2 reports second MDT measurement data to the CN2.

916. The CN2 sends the second MDT measurement data to the corresponding CN1 according to the identity of the PLMN1 in the TR.

917. The CN1 sends the second MDT measurement data to the RNC1/eNodeB1.

918. The RNC1/eNodeB1 sends the second MDT measurement data to the corresponding TCE according to the address of the TCE.

An optional solution of steps 915, 916, 917, and 918 is that the RNC2/eNodeB2 forwards the MDT measurement data to the TCE corresponding to the TCE IP in the second MDT measurement data.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 10A:
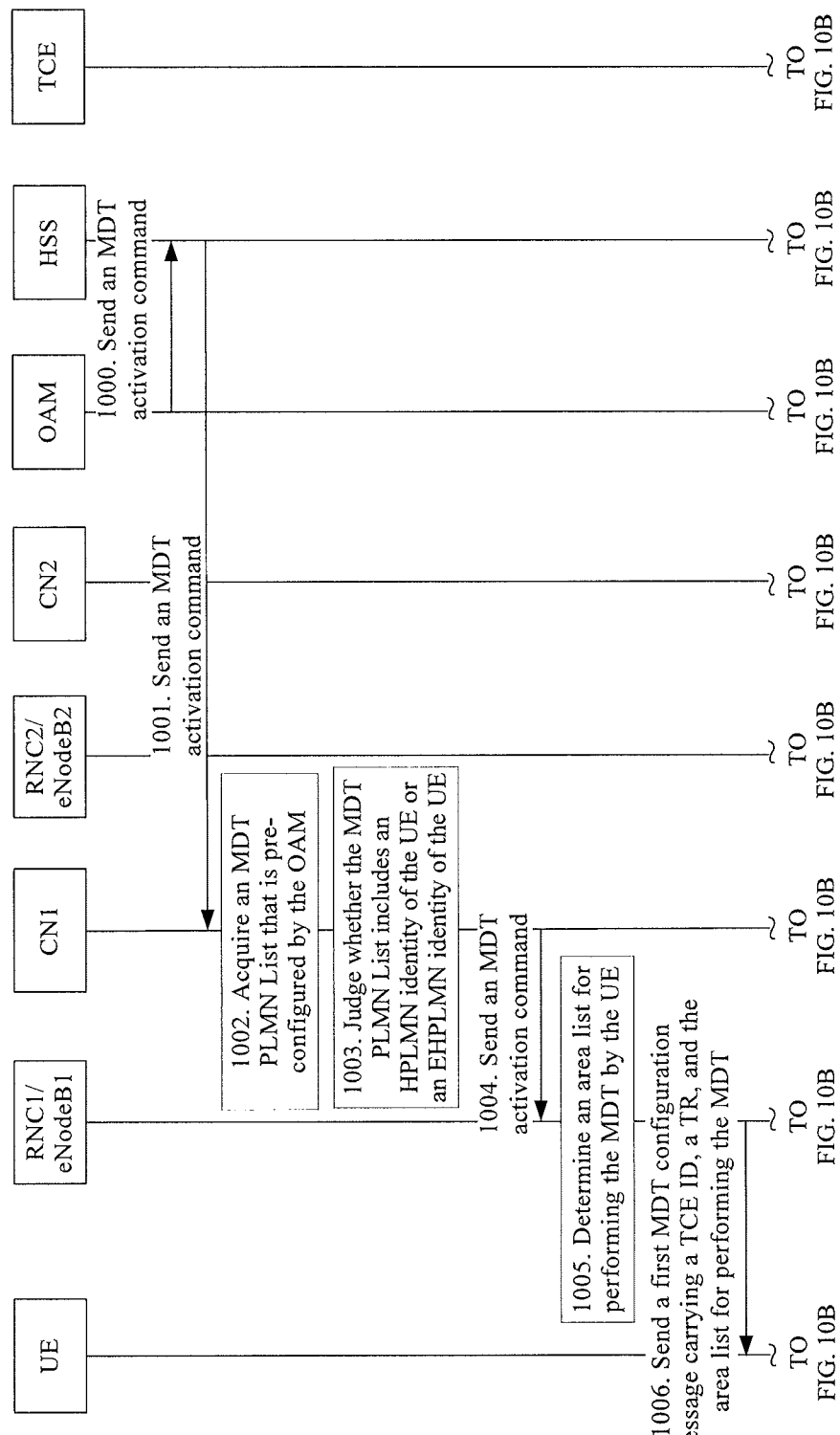
FIG. 10A and FIG. 10B are a signaling diagram of an MDT control method according to another embodiment of the present invention.
Figure 10B:
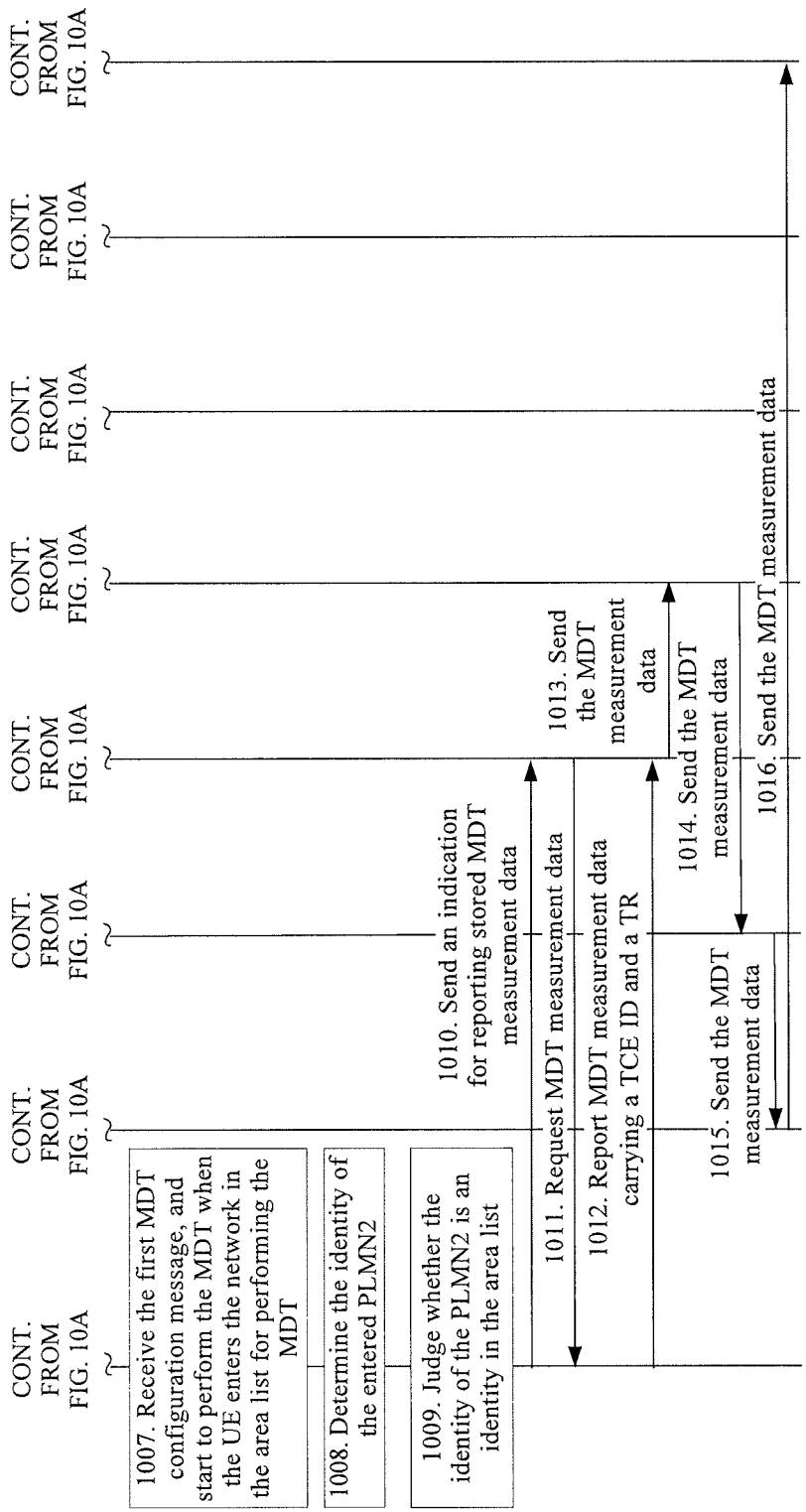

FIG. 10A and FIG. 10B are a signaling diagram of an MDT control method according to another embodiment of the present invention. In the MDT control method in this embodiment, the technical solution of the present invention is described in detail by using an example where the type of the MDT is signaling based the MDT, the reporting type of MDT measurement data is non-real-time reporting and an MDT PLMN List is configured on a CN. As shown in FIG.

10A and FIG. 10B, the MDT control method in this embodiment may specifically include the following contents.

Steps 1000 to 1004 are the same as steps 900 to 904 in the above embodiment shown in FIG. 9A and FIG. 9B, except that the reporting type of MDT measurement data is non-real-time reporting. For details, reference may be made to the description of the above embodiment, which is not further described herein.

Steps 1005 to 1016 are the same as steps 606 to 617 in the embodiment shown in FIG. 6A and FIG. 6B. For details, reference may be made to the description of the above embodiment, which is not further described herein.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 11A:
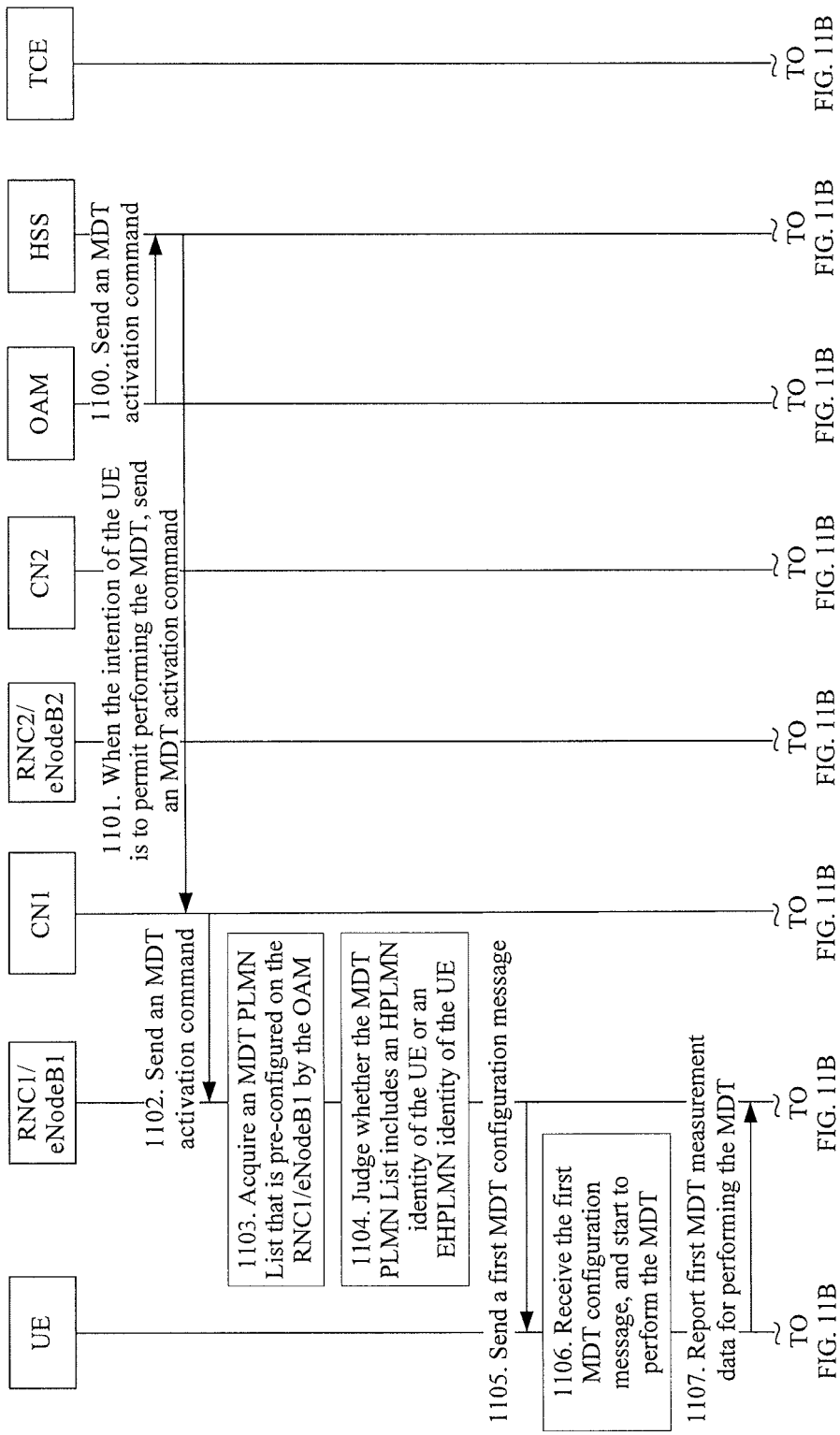
FIG. 11A and FIG. 11B are a signaling diagram of an MDT control method according to another embodiment of the present invention.
Figure 11B:
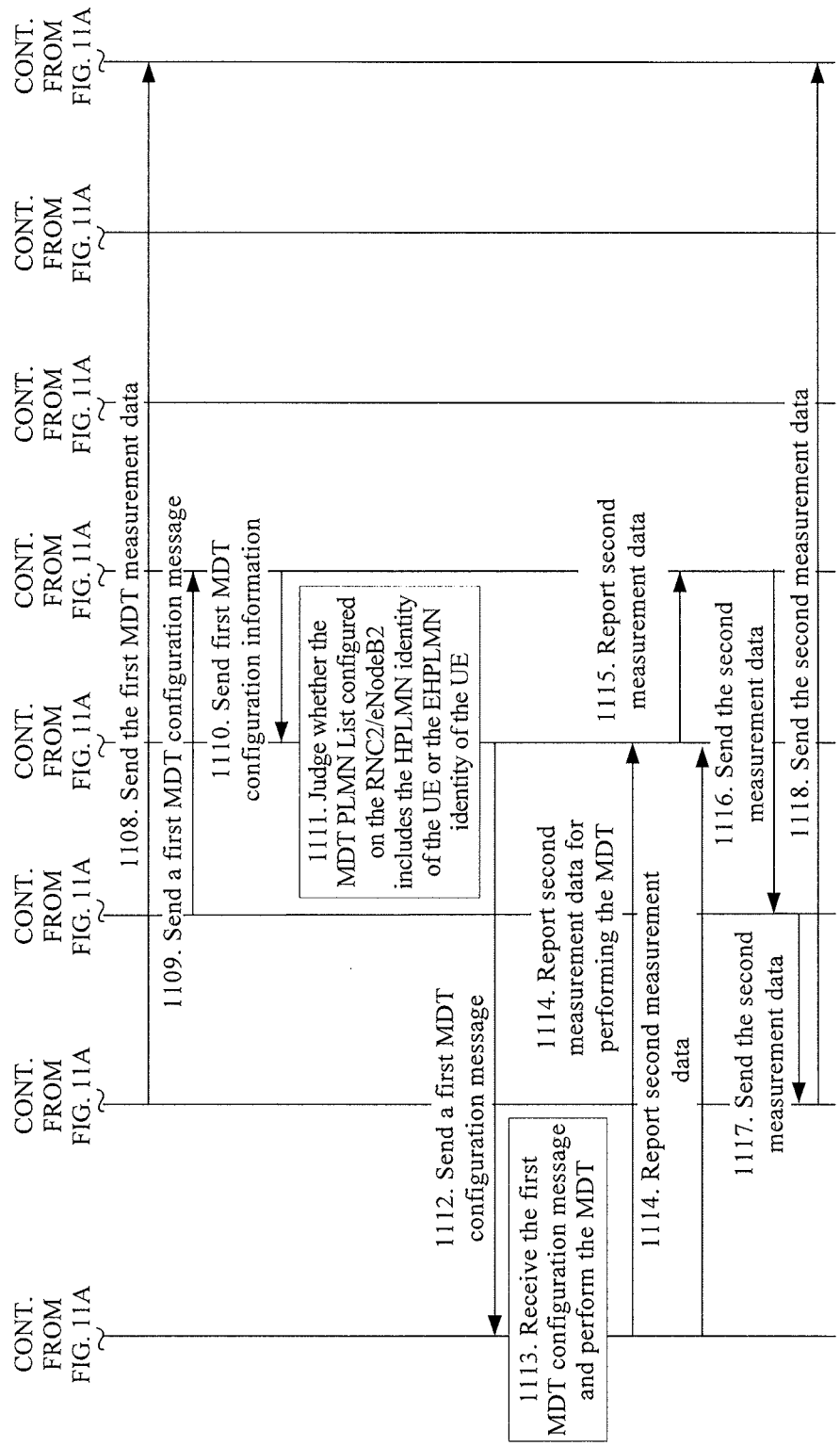

FIG. 11A and FIG. 11B are a signaling diagram of an MDT control method according to another embodiment of the present invention. In the MDT control method in this embodiment, the technical solution of the present invention is described in detail by using an example where the type of the MDT is signaling based the MDT, the reporting type of MDT measurement data is real-time reporting and an MDT PLMN List is configured on an RNC. As shown in FIG. 11A and FIG. 11B, the MDT control method in this embodiment may specifically include the following contents.

Steps 1100 and 1101 are the same as steps 900 and 901 in the embodiment shown in FIG. 9A and FIG. 9B. For details, reference may be made to the description of the above embodiment, which is not further described herein.

1102. The CN1 sends an MDT activation command to the corresponding RNC1/eNodeB1.

Steps 1103 and 1104 are the same as steps 702 and 703 in the embodiment shown in FIG. 7A and FIG. 7B. For details, reference may be made to the description of the above embodiment, which is not further described herein.

When the RNC1/eNodeB1 determines that the MDT PLMN List on the RNC includes the HPLMN identity or EHPLMN identity of the UE in step 1104, it is determined that the UE may perform the MDT in the scope of the MDT PLMN List. Then the procedure goes on to step 1105. Otherwise, when the RNC1/eNodeB1 determines that the MDT PLMN List on the RNC does not include the HPLMN identity or EHPLMN identity of the UE, the procedure ends; or the RNC1/eNodeB1 may send, to the CN1, a notification message or an error indication indicating that the UE cannot perform the MDT.

Steps 1105 to 1109 are the same as steps 905 to 909 in the embodiment shown in FIG. 9A and FIG. 9B. For details, reference may be made to the description of the above embodiment, which is not further described herein.

1110. The CN2 sends the first configuration message received in step 1109 to the RNC2/eNodeB2 accessed by the UE.

Or herein an MDT activation command delivered by the OAM to the CN2 (when the UE is a roaming user equipment) or an MDT activation command delivered by the OAM to the CN2 through the HSS (when the UE is a local user equipment) may be sent by the CN2 to the RNC1/eNodeB1. FIG. 11A and FIG. 11B use an example where first MDT configuration message is delivered.

1111. The RNC2/eNodeB2 judges whether the MDT PLMN List configured on the RNC2/eNodeB2 includes the HPLMN identity of the UE or the EHPLMN identity of the UE.

When the MDT PLMN List configured on the RNC2/eNodeB2 includes the HPLMN identity of the UE or the EHPLMN of the UE, the procedure goes on to step 1112.

When what the CN2 delivers to the RNC2/eNodeB2 is a first MDT configuration message, the RNC2/eNodeB2 may deliver the first MDT configuration message to the UE in step 1112. When what the CN2 delivers to the RNC2/eNodeB2 is an activation command, the first MDT configuration message needs to be re-configured according to the activation command. Steps 1112 to 1118 are the same as steps 912 to 918 in the embodiment shown in FIG. 9A and FIG. 9B. For details, reference may be made to the description of the above embodiment, which is not further described herein.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 12A:
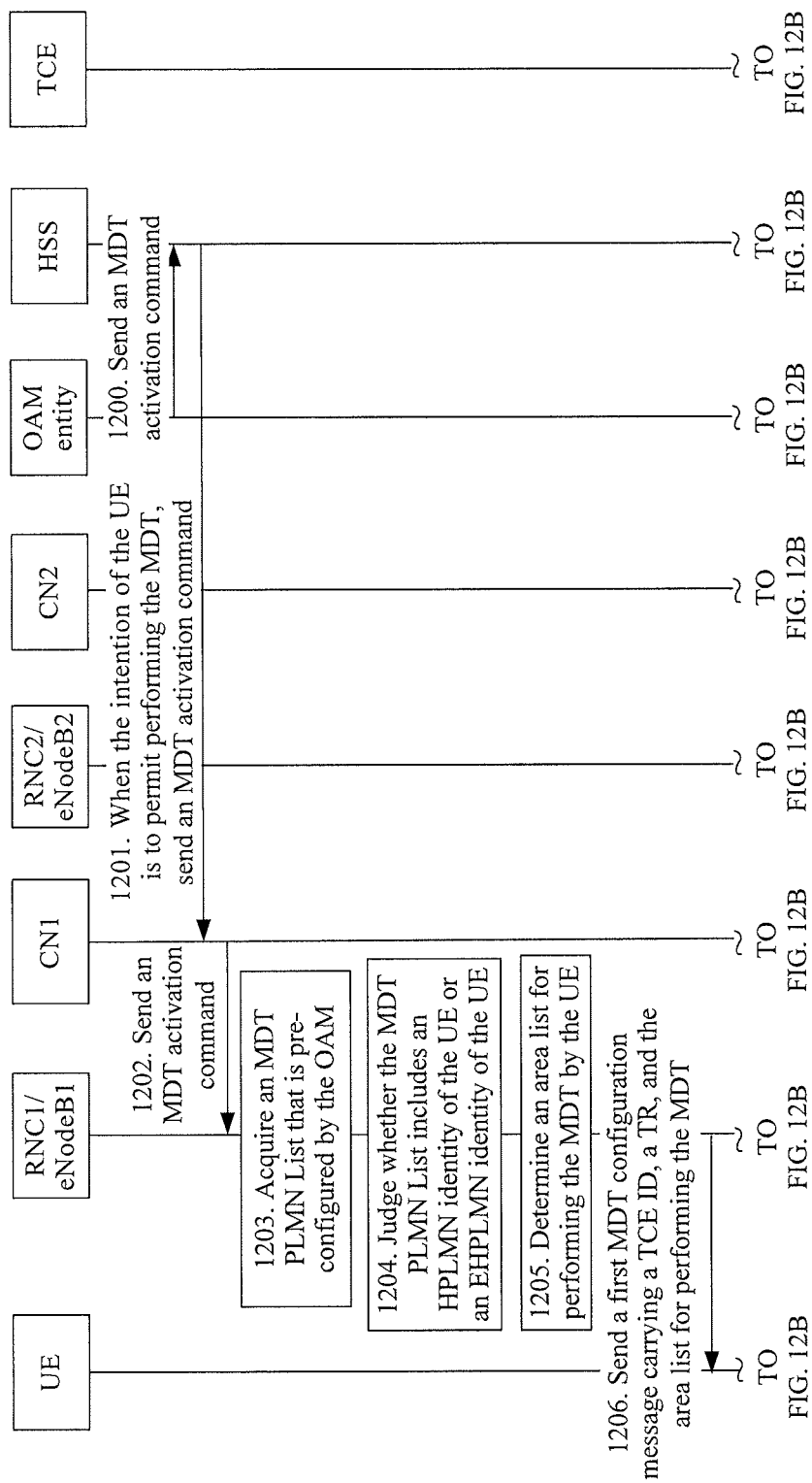
FIG. 12A and FIG. 12B are a signaling diagram of an MDT control method according to another embodiment of the present invention.
Figure 12B:
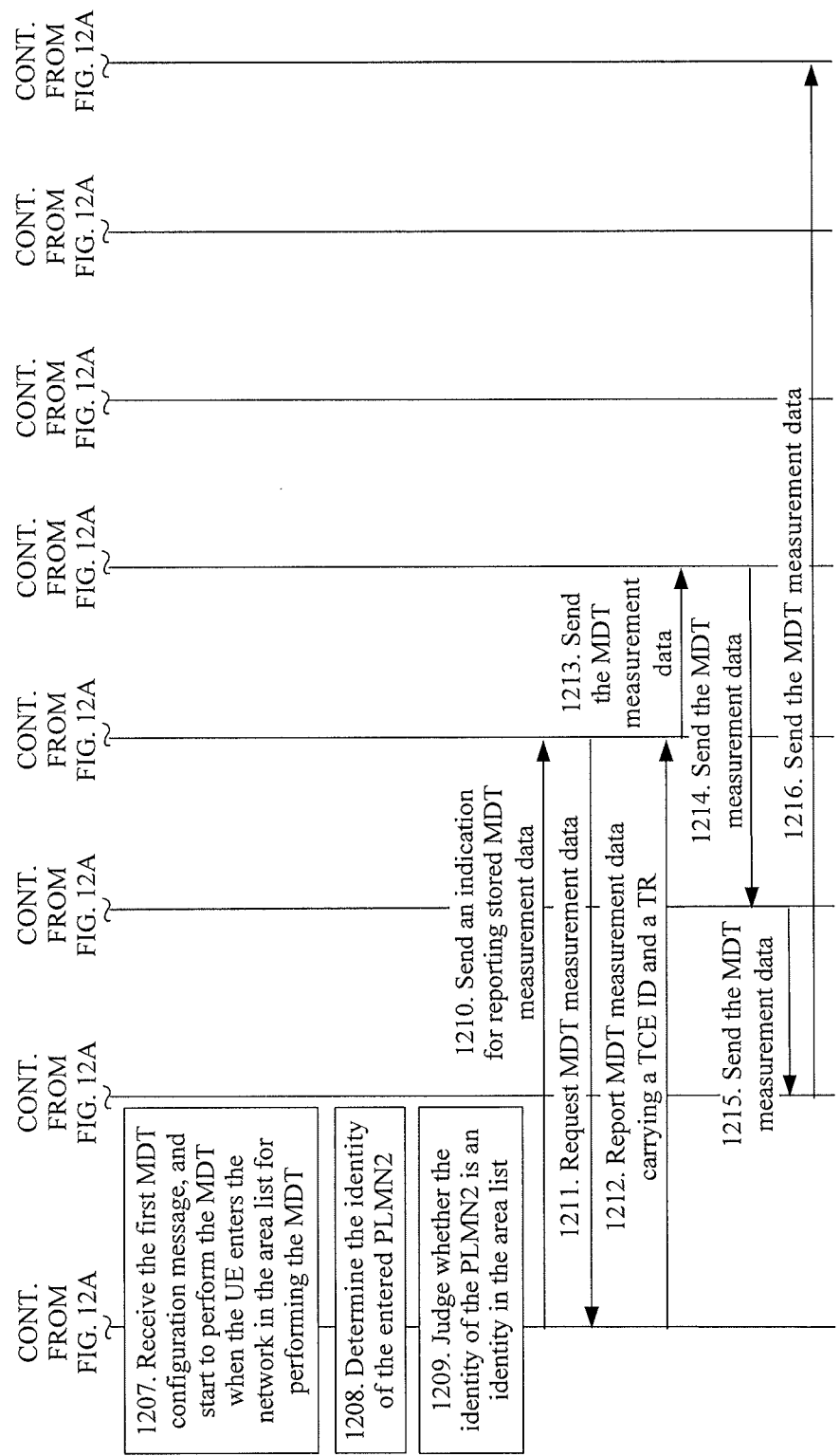

FIG. 12A and FIG. 12B are a signaling diagram of an MDT control method according to another embodiment of the present invention. In the MDT control method in this embodiment, the technical solution of the present invention is described in detail by using an example where the type of the MDT is signaling based the MDT, the reporting type of MDT measurement data is non-real-time reporting and an MDT PLMN List is configured on an RNC. As shown in FIG. 12A and FIG. 12B, the MDT control method in this embodiment may specifically include the following contents.

Steps 1200 and 1201 are the same as steps 1000 and 1001 in the embodiment shown in FIG. 10A and FIG. 10B. For details, reference may be made to the description of the above embodiment, which is not further described herein.

1202. The CN1 sends an MDT activation command to the corresponding RNC1/eNodeB1.

Steps 1203 and 1204 are the same as steps 702 and 703 in the embodiment shown in FIG. 7A and FIG. 7B. For details, reference may be made to the description of the above embodiment, which is not further described herein.

When the MDT PLMN List includes the HPLMN identity or EHPLMN identity of the UE, it is determined that the UE may perform the MDT in the scope of the MDT PLMN List. Then the procedure goes on to step 1207. Otherwise, the procedure ends.

Steps 1205 to 1216 are the same as steps 606 to 617 in the embodiment shown in FIG. 6A and FIG. 6B. For details, reference may be made to the description of the above embodiment, which is not further described herein.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 13A:
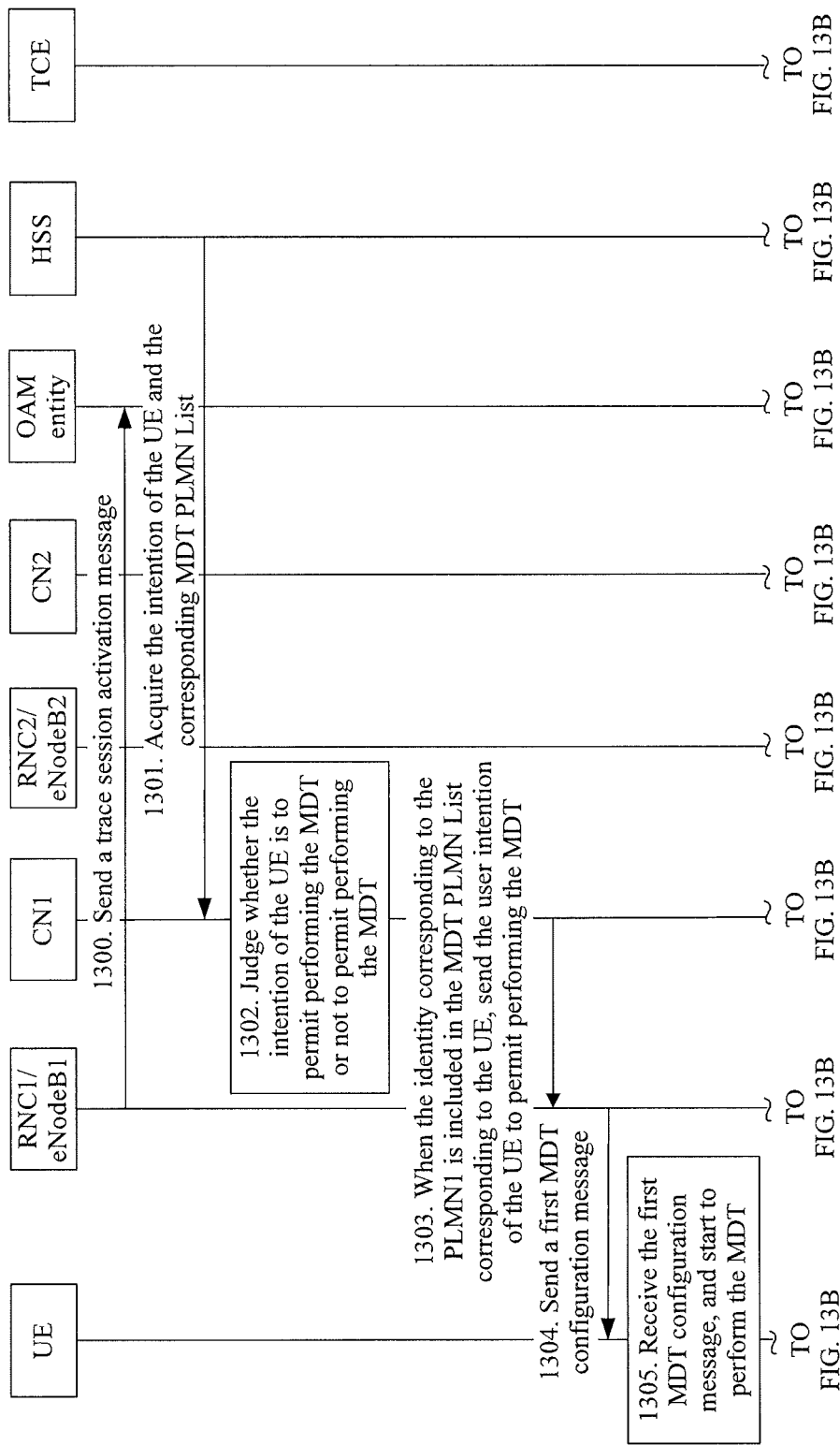
FIG. 13A and FIG. 13B are a signaling diagram of an MDT control method according to another embodiment of the present invention.
Figure 13B:
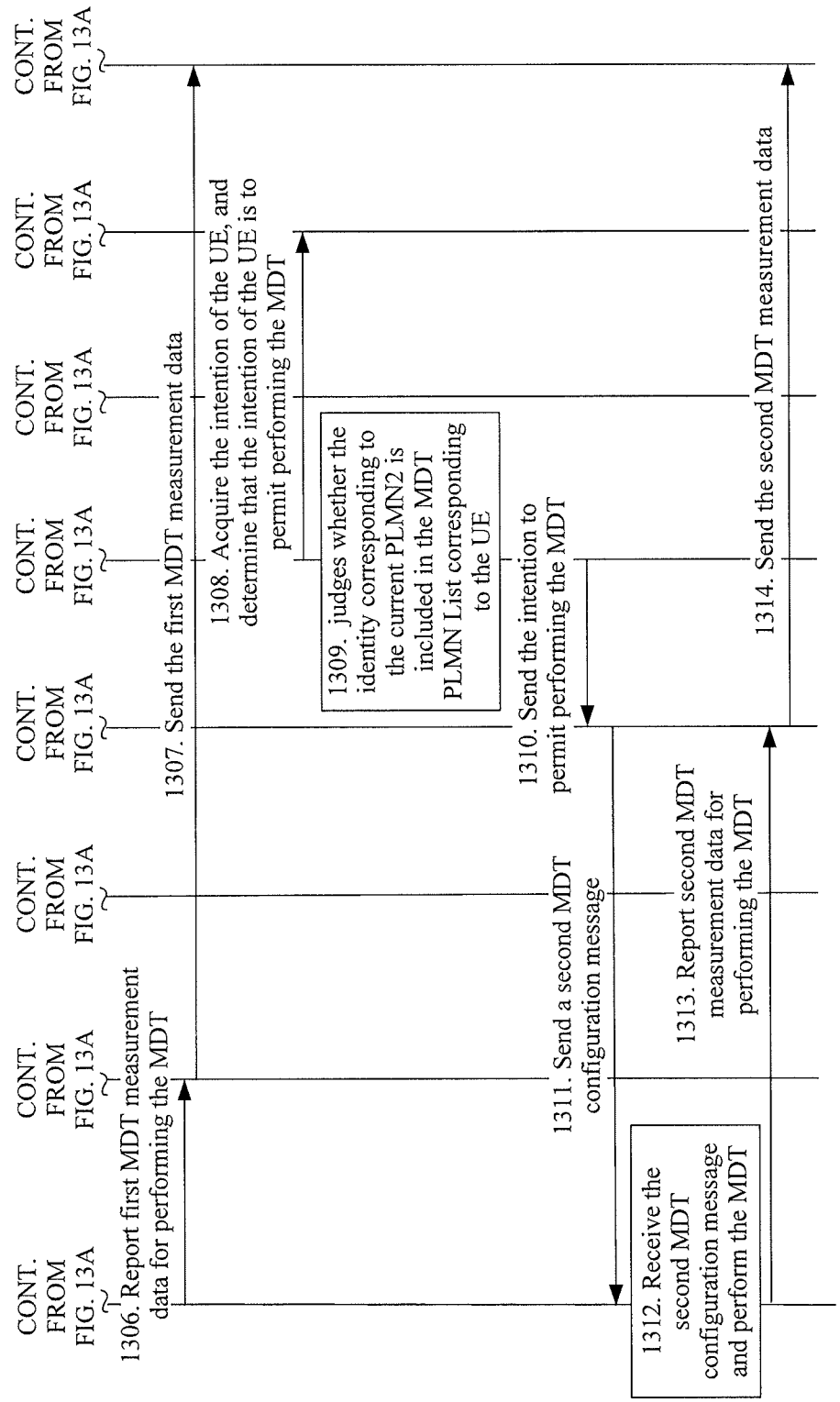

FIG. 13A and FIG. 13B are a signaling diagram of an MDT control method according to another embodiment of the present invention. In the MDT control method in this embodiment, the technical solution of the present invention is described in detail by using an example where the type of the MDT is management based MDT, the reporting type of MDT measurement data is real-time reporting and an MDT PLMN List is configured on an HSS. As shown in FIG. 13A and FIG. 13B, the MDT control method in this embodiment may specifically include the following contents.

Step 1300 is the same as step 500 in the embodiment shown in FIG. 5A and FIG. 5B. For details, reference may be made to the description of the above embodiment, which is not further described herein.

1301. The CN1 acquires the intention of the UE and the corresponding MDT PLMN List from the HSS.

In this embodiment, the MDT PLMN List is configured based on the UE, and is stored as subscription information of the UE into the HSS.

1302. The CN1 judges whether the intention of the UE is to permit performing the MDT or not to permit performing the MDT, and when the intention of the UE is to permit performing the MDT, continues to perform step 1303; otherwise, the procedure ends.

1303. The CN1 judges whether the identity of the current PLMN1 is included in the MDT PLMN List corresponding to the UE, and when the identity corresponding to the PLMN1 is included in the MDT PLMN List corresponding to the UE, sends, to the RNC1/eNodeB1, the user intention of the UE to permit performing the MDT, so that the RNC1/eNodeB1 selects the UE to perform the MDT. Then the procedure goes on to step 1304.

Steps 1304 to 1308 are the same as step 506 to 510 in the embodiment shown in FIG. 5A and FIG. 5B. For details, reference may be made to the description of the above embodiment, which is not further described herein.

Step 1309 is different from step 511: The CN2 judges whether the identity corresponding to the current PLMN2 is included in the MDT PLMN List corresponding to the UE; when the identity corresponding to the PLMN2 is included in the MDT PLMN List corresponding to the UE, the UE may be selected to perform the MDT.

Steps 1310 to 1314 are the same as steps 512 to 516 in the embodiment shown in FIG. 5A and FIG. 5B. For details, reference may be made to the description of the above embodiment, which is not further described herein.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 14A:
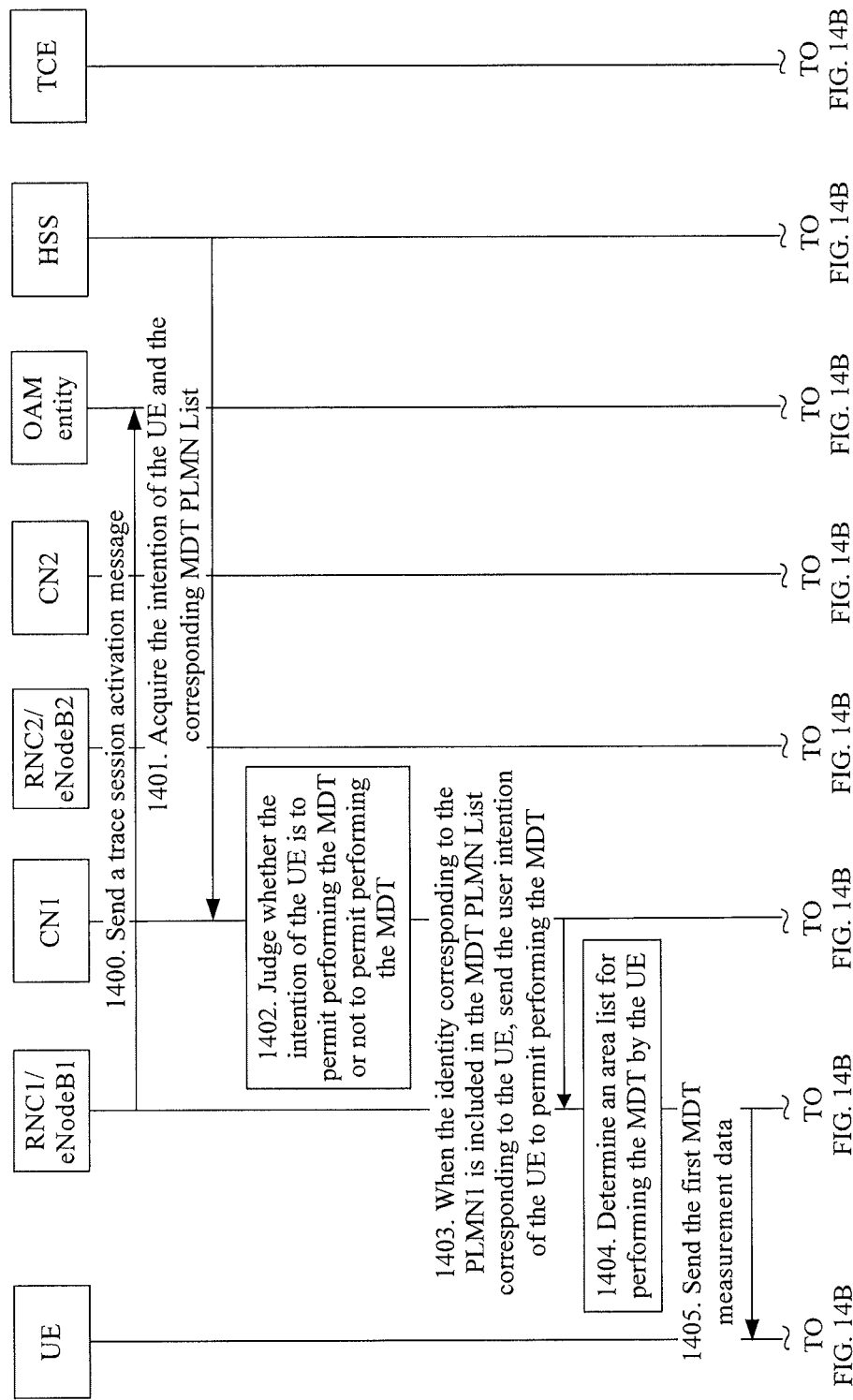
FIG. 14A and FIG. 14B are a signaling diagram of an MDT control method according to another embodiment of the present invention.
Figure 14B:
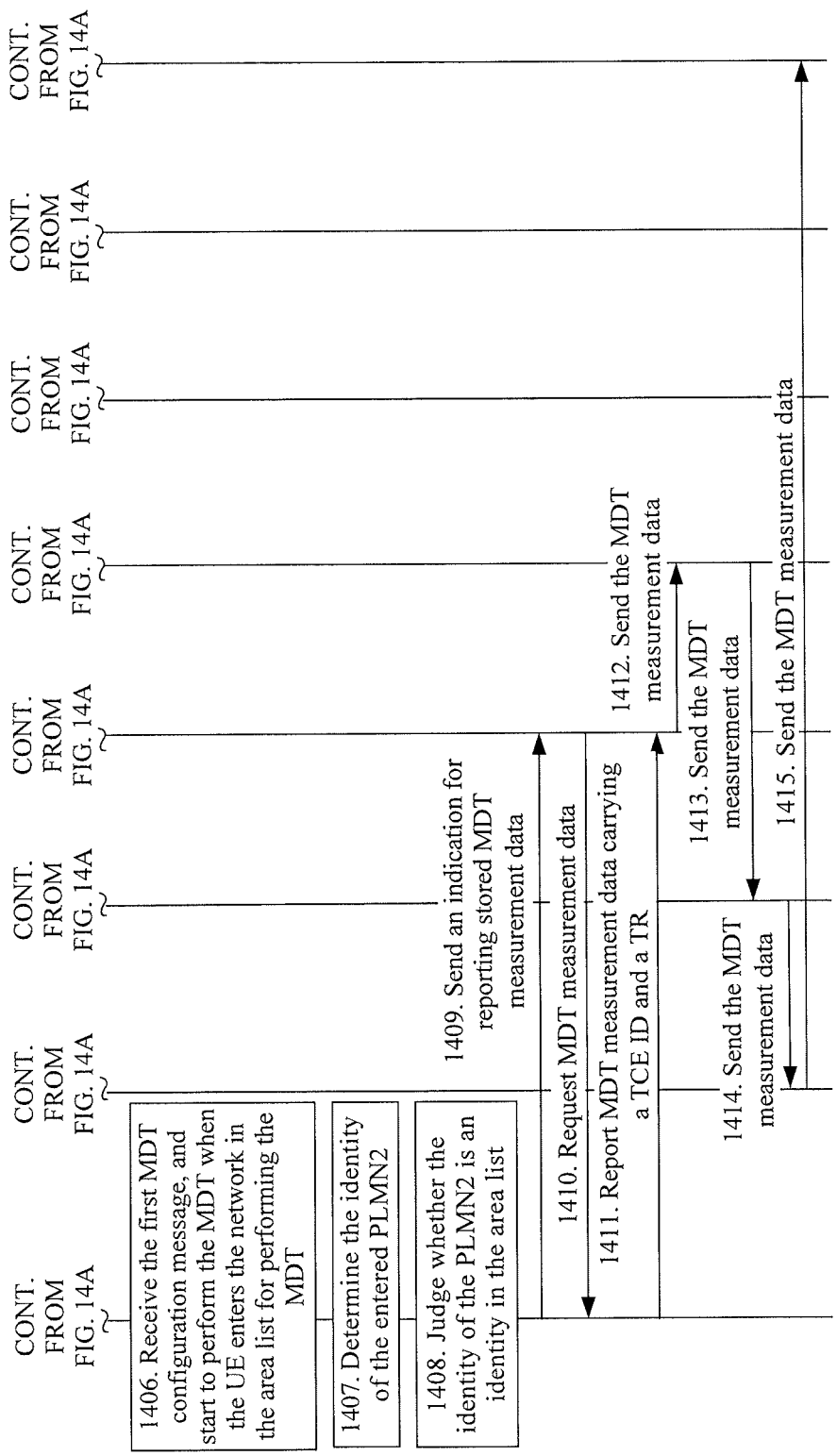

FIG. 14A and FIG. 14B are a signaling diagram of an MDT control method according to another embodiment of the present invention. In the MDT control method in this embodiment, the technical solution of the present invention is described in detail by using an example where the type of the MDT is management based the MDT, the reporting type of MDT measurement data is non-real-time reporting and an MDT PLMN List is configured on an HSS. As shown in FIG. 13A and FIG. 13B, the MDT control method in this embodiment may specifically include the following contents.

Step 1400 is the same as step 500 in the embodiment shown in FIG. 5A and FIG. 5B. For details, reference may be made to the description of the above embodiment, which is not further described herein.

Steps 1401 and 1402 are the same as steps 1301 and 1302 in the embodiment shown in FIG. 13A and FIG. 13B. For details, reference may be made to the description of the above embodiment, which is not further described herein.

1403. The CN1 judges whether the identity of the current PLMN1 is included in the MDT PLMN List corresponding to the UE, and when the identity corresponding to the PLMN1 is included in the MDT PLMN List corresponding to the UE, sends, to the RNC1/eNodeB1, the user intention of the UE to permit performing the MDT, so that the RNC1/eNodeB1 selects the UE to perform the MDT. Then the procedure goes on to step 1404.

Steps 1404 to 1415 are the same as steps 606 to 617 in the embodiment shown in FIG. 6A and FIG. 6B. For details, reference may be made to the description of the above embodiment, which is not further described herein.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 15B:
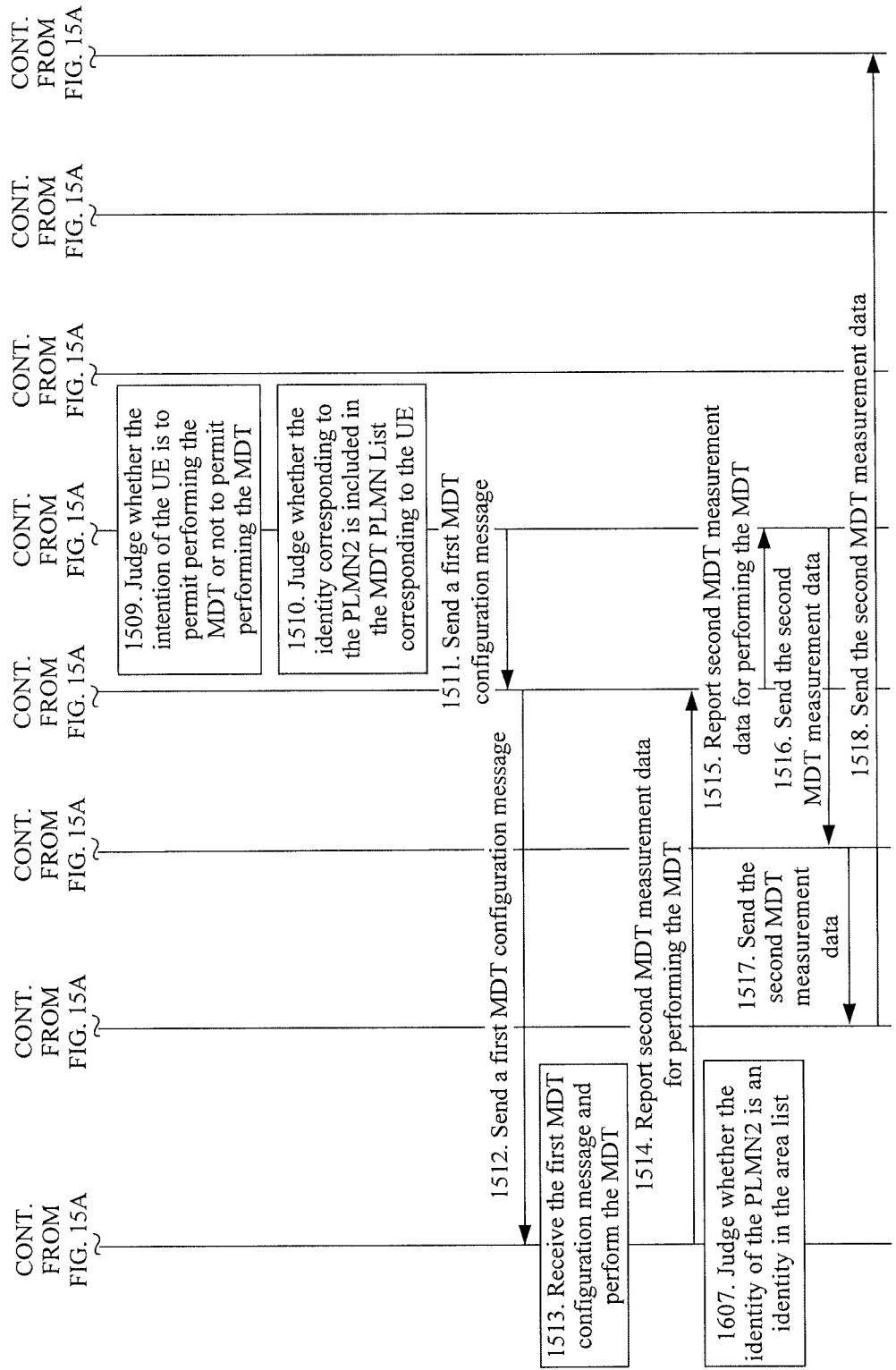

FIG. 15A and FIG. 15B are a signaling diagram of an MDT control method according to another embodiment of the present invention. In the MDT control method in this embodiment, the technical solution of the present invention is described in detail by using an example where the type of the MDT is signaling based MDT, the reporting type of MDT measurement data is real-time reporting and an MDT PLMN List is configured on an HSS. As shown in FIG. 15A and FIG. 15B, the MDT control method in this embodiment may specifically include the following contents.

Step 1500 is the same as step 900 in the embodiment shown in FIG. 9A and FIG. 9B. For details, reference may be made to the description of the above embodiment, which is not further described herein.

1501. The HSS searches to determine to determine whether the stored intention of the UE is to permit performing the MDT, and when the intention of the UE is to permit performing the MDT, the HSS sends an MDT activation command and the MDT PLMN List corresponding to the UE to the CN1; otherwise, the procedure ends.

This embodiment is similar to the embodiment shown in FIG. 14A and FIG. 14B, and the MDT PLMN List is stored as the subscription information of the user into the HSS.

1502. The CN1 judges whether the identity of the current PLMN1 is included in the MDT PLMN List corresponding to the UE, and when the identity corresponding to the PLMN1 is included in the MDT PLMN List corresponding to the UE, sends an MDT activation command to the corresponding RNC1/eNodeB1.

Steps 1503 to 1506 are the same as step 905 to 908 in the embodiment shown in FIG. 9A and FIG. 9B. For details, reference may be made to the description of the above embodiment, which is not further described herein.

Optionally, when steps 1505 to 1506 are not performed, and the UE moves to another PLMN2 from the current PLMN1, assuming that the UE accesses an RNC2 in a CN2 corresponding to the PLMN, the method may further include the following steps:

Step 1507 is the same as step 909 in the embodiment shown in FIG. 9A and FIG. 9B. For details, reference may be made to the description of the above embodiment, which is not further described herein.

1508. The CN2 acquires the intention of the UE and the corresponding MDT PLMN List corresponding to the UE from the HSS.

1509. The CN2 judges whether the intention of the UE is to permit performing the MDT or not to permit performing the MDT, and when the intention of the UE is to permit performing the MDT, continues to perform step 1511; otherwise, the procedure ends.

1510. The CN2 judges whether the identity corresponding to the PLMN2 is included in the MDT PLMN List corresponding to the UE; and when the identity corresponding to the PLMN2 is included in the MDT PLMN List corresponding to the UE, determines that the UE can continue to perform the MDT in the PLMN2; otherwise, determines that the UE cannot perform the MDT in the PLMN2.

Steps 1511 to 1518 are the same as steps 911 to 918 in the embodiment shown in FIG. 9A and FIG. 9B. For details, reference may be made to the description of the above embodiment, which is not further described herein.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 16B:
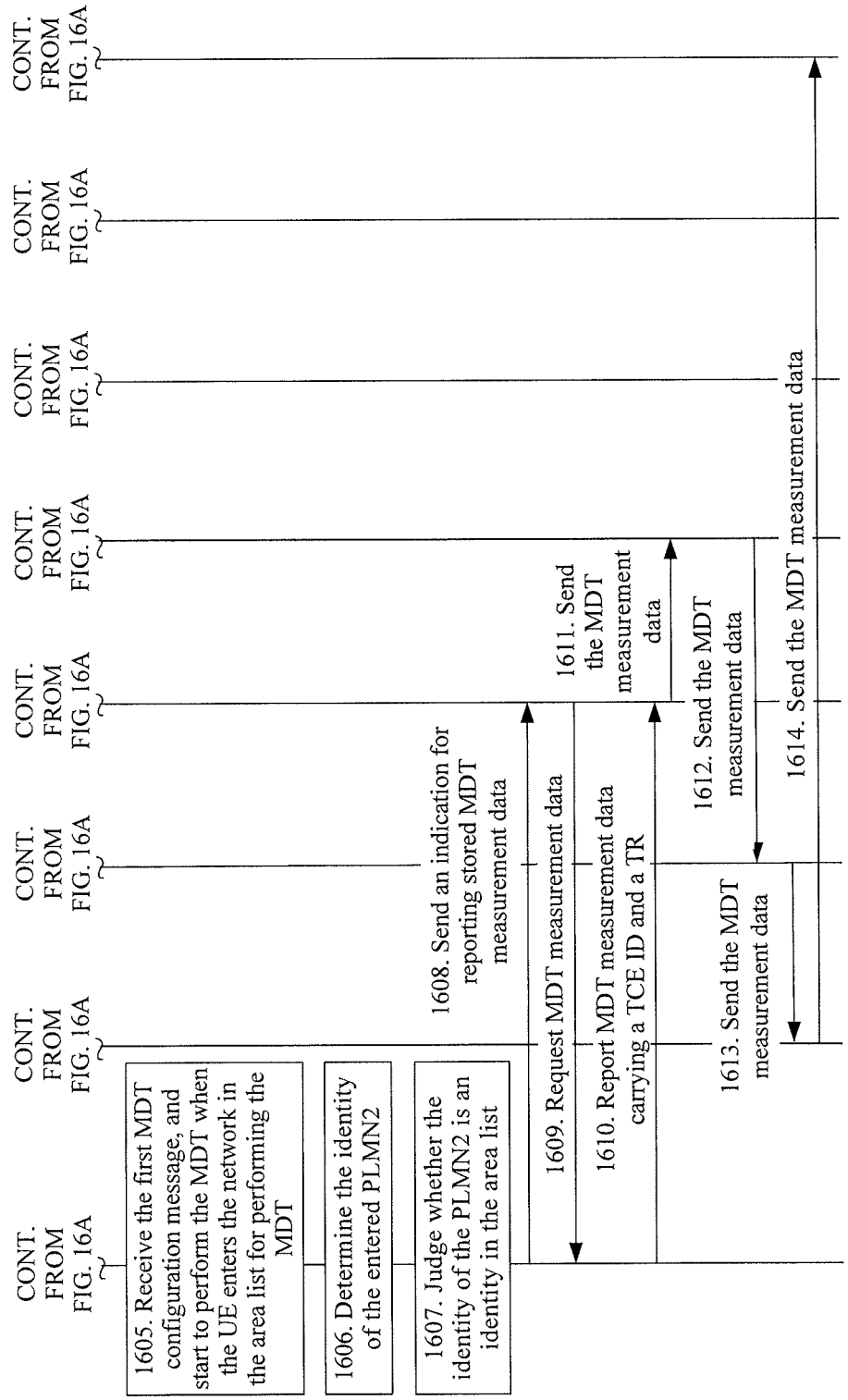

FIG. 16A and FIG. 16B are a signaling diagram of an MDT control method according to another embodiment of the present invention. In the MDT control method in this embodiment, the technical solution of the present invention is described in detail by using an example where the type of the MDT is signaling based the MDT, the reporting type of MDT measurement data is non-real-time reporting and an MDT PLMN List is configured on an HSS. As shown in FIG. 16A and FIG. 16B, the MDT control method in this embodiment may specifically include the following contents.

Step 1600 is the same as step 1000 in the embodiment shown in FIG. 10A and FIG. 10B. For details, reference may be made to the description of the above embodiment, which is not further described herein.

Steps 1601 and 1602 are the same as steps 1501 and 1502 in the embodiment shown in FIG. 15A and FIG. 15B. For details, reference may be made to the description of the above embodiment, which is not further described herein.

Steps 1603 to 1614 are the same as steps 606 to 617 in the embodiment shown in FIG. 6A and FIG. 6B. For details, reference may be made to the description of the above embodiment, which is not further described herein.

In the MDT control method in this embodiment, by using the above technical solution, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Persons of ordinary skill in the art may understand that all or part of the steps in the method according to the embodiments can be implemented by a program instructing relevant hardware. The program may be stored in a computer readable storage medium and when the program runs, the steps in the method according to the embodiments are performed. The storage medium includes any medium capable of storing program code, such as a ROM, a RAM, a magnetic disk, or an optical disc.

Figure 17:
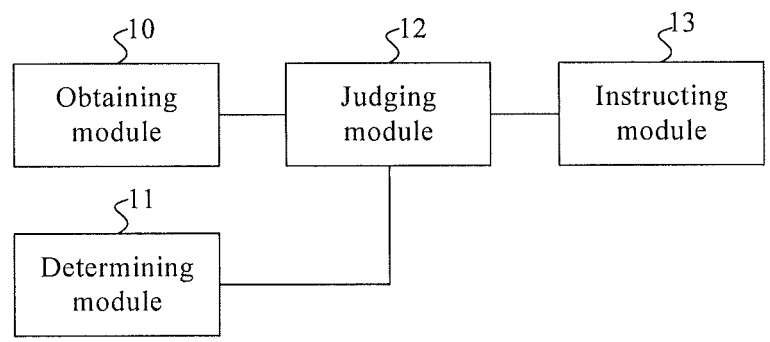
FIG. 17 is a schematic structural diagram of a network element device according to an embodiment of the present invention.

FIG. 17 is a schematic structural diagram of a network element device according to an embodiment of the present invention. As shown in FIG. 17, the network element device in this embodiment may include: an obtaining module 10, a determining module 11, a judging module 12, and an instructing module 13.

The obtaining module 10 is configured to acquire an MDT PLMN List, where the MDT PLMN List includes at least two PLMN identities, and UEs in at least two PLMNs corresponding to the at least two PLMN identities can perform MDT in the at least two PLMNs. The determining module 11 is configured to: when a first UE accesses a current PLMN, acquire and determine that a user intention of the first UE is to permit performing the MDT. The judging module 12 is connected to the determining module 11 and the obtaining module 10 respectively, and the judging module 12 is configured to: when the determining module 11 determines that the user intention of the first UE is to permit performing the MDT, judge whether the MDT PLMN List acquired by the obtaining module 10 includes an HPLMN identity or an EHPLMN identity of the first UE. The instructing module 13 is connected to the judging module 12, and the instructing module 13 is configured to: when the MDT PLMN List includes the HPLMN identity or EHPLMN identity of the first UE, instruct the first UE to perform the MDT measurements.

In the network element device in this embodiment, the implementation process in which the above modules are used to implement MDT control is the same as the implementation process of the above related method embodiment. For details, reference may be made to the description of the above method embodiment, which is not further described herein.

In the network element device in this embodiment, by using the above modules, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Optionally, the network element device in the above embodiment may be a CN node, and the network element device may also be an RNC/eNodeB.

Figure 18:
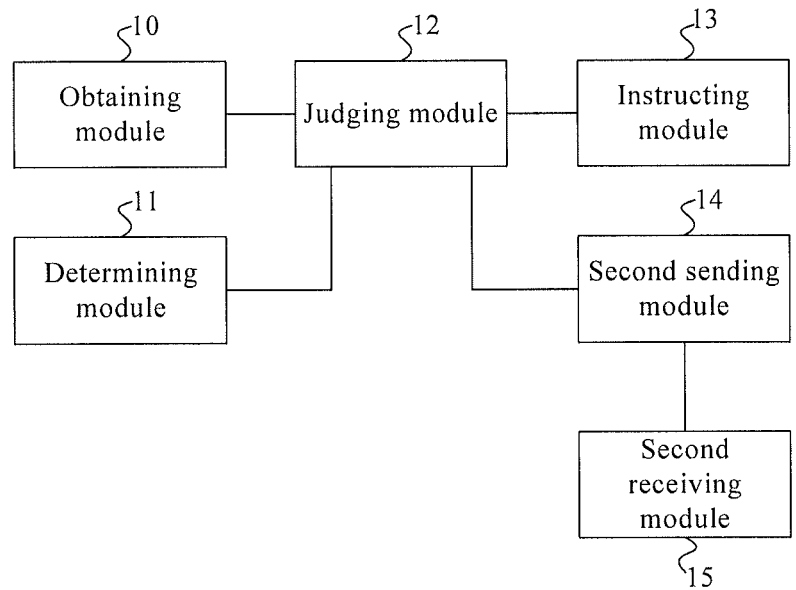
FIG. 18 is a schematic structural diagram of a network element device according to another embodiment of the present invention.

FIG. 18 is a schematic structural diagram of a network element device according to another embodiment of the present invention. On the basis of the embodiment shown in FIG. 17, the network element device in this embodiment may further include the following technical solution:

In this embodiment, the network element device may be a CN node. The obtaining module 10 is specifically configured to acquire the MDT PLMN List from the CN node, where the MDT PLMN List is pre-configured in the CN node by an OAM entity. The determining module 11 is specifically configured to acquire and determine, from an HSS, that the user intention of the first UE is to permit performing the MDT.

Optionally, in this embodiment, when the type of the MDT is management based MDT, the instructing module 13 is configured to send, to the RNC/eNodeB, the user intention of the first UE to permit performing the MDT, so as to instruct the RNC/eNodeB to select the first UE to perform the MDT, and the RNC/eNodeB delivers a first MDT configuration message to the first UE to instruct the first UE to perform the MDT, where the first MDT message is configured by the RNC/eNodeB according to a received trace session activation message that is sent by the OAM entity and carries a reporting type of MDT data, an address of a TCE, and a trace reference carrying an identity of the current PLMN.

Optionally, the network element device in this embodiment may further include a second sending module 14, where the second sending module 14 is configured to send the MDT PLMN List to the first UE, so that the UE determines, according to the MDT PLMN List, an area for performing the MDT.

Optionally, in the network element device in this embodiment, when the type of the MDT is signaling based MDT, the network element device in this embodiment may further include a second receiving module 15. The second receiving module 15 is configured to: when the first UE is a roaming user equipment, receive an MDT activation command sent by the OAM entity, where the MDT activation command carries a reporting type of MDT measurement data, an address of a TCE, an identity of the first UE, and a trace reference carrying an identity of the current PLMN; or the second receiving module 15 is configured to: when the first UE is a local user equipment, receive an MDT activation command sent by the HSS, where the MDT activation command is sent by the HSS after the HSS determines that the user intention of the first UE is to permit performing the MDT.

Optionally, in the network element device in this embodiment, when the type of the MDT is signaling based MDT, the obtaining module 10 is further configured to acquire the user intention of the first UE from the HSS when the first UE is a roaming user equipment, and determine that the user intention of the UE is to permit performing the MDT.

Optionally, in the network element device in this embodiment, when the type of the MDT is signaling based MDT, the instructing module 13 is configured to send the MDT activation command to the RNC/eNodeB, so that the RNC/eNodeB configures a first MDT configuration message according to the MDT activation command, and the RNC/eNodeB delivers the first MDT configuration message to the first UE to instruct the first UE to perform the MDT.

Optionally, in the network element device in this embodiment, when the type of the MDT is signaling based MDT, and the reporting type of MDT data is real-time reporting, the second receiving module 15 is further configured to: when a second UE performing the MDT in a previous PLMN moves to the current PLMN, receive a second MDT configuration message sent by a previous CN node corresponding to the previous PLMN. The judging module 12 is further configured to judge whether the second UE can perform the MDT in the current PLMN. The second sending module 14 is connected to the judging module 12, and the second sending module 14 is further configured to: when the judging module 12 determines that the second UE can perform the MDT in the current PLMN, send the second MDT configuration message received by the second receiving module 15 to the second UE, so as to instruct the second UE to continue to perform the MDT.

Further, optionally, in the network element device in this embodiment, when the type of the MDT is signaling based MDT, and the reporting type of MDT data is real-time reporting, the judging module 12 is specifically configured to judge whether the MDT PLMN List includes a home PLMN identity or an equivalent home PLMN identity of the second UE, and when the MDT PLMN List includes the home PLMN identity or equivalent home PLMN identity of the second UE, determine that the second UE can perform the MDT in the current PLMN; otherwise, determine that the second UE cannot perform the MDT in the current PLMN.

Further, optionally, in the network element device in this embodiment, when the type of the MDT is signaling based MDT, and the reporting type of MDT data is real-time reporting, the second receiving module 15 is further configured to receive the second MDT data that is sent by the UE through the RNC/eNodeB. The second sending module 14 is connected to the second receiving module 15, and the second sending module 14 is further configured to send the second MDT data received by the second receiving module 15 to the previous CN node, so that the previous CN node sends the second MDT data to a corresponding previous RNC/eNodeB, and the previous RNC/eNodeB sends the second MDT data to a corresponding TCE.

In the network element device in the embodiment of the present invention, the above included multiple optional embodiments are used as examples for describing the technical solution of the present invention. In an actual application, any combination of the optional technical solutions of signaling based MDT and management based MDT in the above embodiment may constitute an optional embodiment of the present invention.

In the network element device in the embodiment of the present invention, the implementation mechanism in which the above modules are used to implement the MDT control method is the same as the implementation mechanism of the extended embodiments of FIG. 1 and the related embodiments shown in FIG. 5A and FIG. 5B to FIG. 12A and FIG. 12B. For details, reference may be made to the description of the above related embodiments, which is not further described herein.

In the network element device in this embodiment, by using the above modules, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 19:
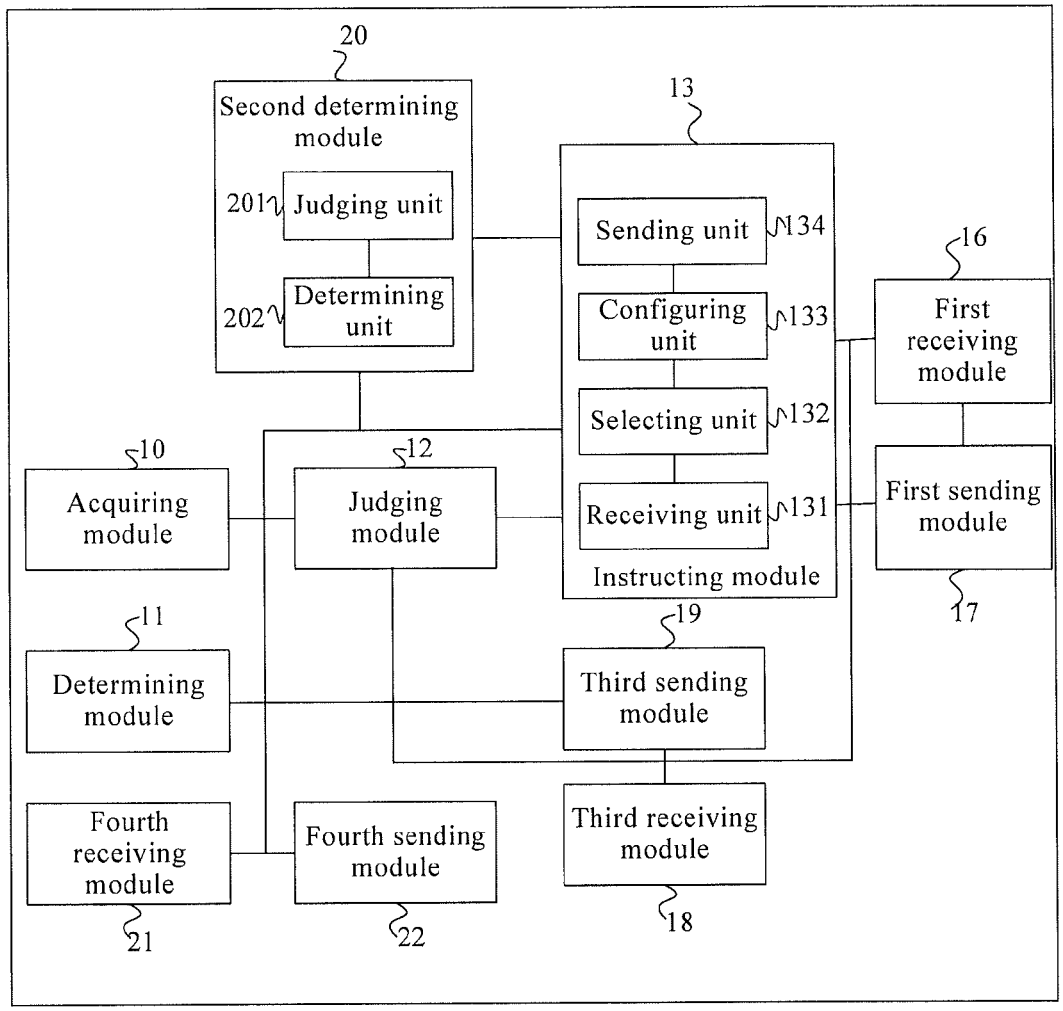
FIG. 19 is a schematic structural diagram of a network element device according to another embodiment of the present invention.

FIG. 19 is a schematic structural diagram of a network element device according to another embodiment of the present invention. On the basis of the embodiment shown in FIG. 17, the network element device in this embodiment may further include the following technical solution:

In this embodiment, the network element device may be an RNC/eNodeB.

Optionally, the obtaining module 10 in the network element device in this embodiment is specifically configured to acquire the MDT PLMN List from the RNC/eNodeB, where the MDT PLMN List is pre-configured in the RNC/eNodeB by the OAM entity; or the obtaining module 10 is specifically configured to receive the MDT PLMN List sent by the CN node, where the MDT PLMN List is pre-configured in the CN node by the OAM entity. The determining module 11 is specifically configured to receive the user intention of the first UE to permit performing the MDT, which is sent by the CN node, where the user intention of the first UE to permit performing the MDT is acquired by the CN node from the HSS.

Optionally, in the network element device in this embodiment, when the type of the MDT is management based MDT, the network element device may further include a first receiving module 16. The first receiving module 16 is configured to receive a trace session activation message sent by the OAM entity, where the trace session activation message carries a reporting type of MDT measurement data, an address of a TCE, and a trace reference carrying an identity of the current PLMN.

Further, optionally, in the network element device in this embodiment, when the type of the MDT is management based MDT, the instructing module 13 includes: a receiving unit 131, a selecting unit 132, a configuring unit 133, and a sending unit 134.

The receiving unit 131 is connected to the judging module 12, and the receiving unit 131 is configured to: when the judging module 12 determines that the MDT PLMN List includes the HPLMN identity or EHPLMN identity of the first UE, receive the user intention of permitting the first UE to perform the MDT, where the user intention is sent by the CN node. The selecting unit 132 is connected to the receiving unit 131, and the selecting unit 132 is configured to select the first UE to perform the MDT, when the receiving unit 131 receives the user intention of permitting the first UE to perform the MDT, where the user intention is sent by the CN node. The configuring unit 133 is connected to the first receiving module 16, and the configuring unit 133 is configured to configure a first MDT configuration message according to the trace session activation message received by the first receiving module 16. The sending unit 134 is connected to the configuring unit 133, and the sending unit 134 is configured to send the first MDT configuration message configured by the configuring unit 133 to the first UE to instruct the first UE to perform the MDT. FIG. 19 uses the optional solution as an example.

Further, optionally, in the network element device in this embodiment, when the type of the MDT is management based MDT, and the reporting type of MDT measurement data is non-real-time reporting, the configuring unit 133 is specifically configured to configure, according to the trace session activation message received by the first receiving module 16, a first MDT configuration message carrying an address of a TCE and a trace reference.

Further, optionally, in the network element device in this embodiment, when the type of the MDT is management based MDT, and the reporting type of MDT measurement data is real-time reporting, the judging module 12 is further configured to: when it is determined that the user intention of the second UE is to permit performing the MDT when a second UE performing the MDT in a previous PLMN moves to the current PLMN, judge whether the second UE can continue to perform the MDT in the current PLMN. The instructing module 13 is configured to: when the judging module 12 determines that the second UE can continue to perform the MDT in the current PLMN, send the first MDT configuration message to the second UE to instruct the second UE to perform the minimization of drive-tests.

Optionally, the judging module 12 is specifically configured to judge whether the MDT PLMN List includes the home PLMN identity of the second UE or the equivalent home PLMN identity of the second UE; and when the MDT PLMN List includes the home PLMN identity of the second UE or the equivalent home PLMN identity of the second UE, determine that the second UE can continue to perform the MDT in the current PLMN; otherwise, determine that the second UE cannot perform the MDT in the current PLMN.

Further, optionally, in the network element device in this embodiment, when the type of the MDT is management based MDT, and the reporting type of MDT measurement data is real-time reporting, the network element device in this embodiment further includes a first sending module 17. The first receiving module 16 is configured to receive MDT data reported by the second UE. The first sending module 17 is connected to the first receiving module 16, and the first sending module 17 is configured to send, according to the address of the TCE, the MDT measurement data received by the first receiving module 16 to the corresponding TCE.

Optionally, in the network element device in this embodiment, when the type of the MDT is signaling based MDT, the instructing module 13 includes only a receiving unit 131, a configuring unit 133, and a sending unit 134.

In this case, the receiving unit 131 is configured to receive an MDT activation command sent by the CN node, where the MDT activation command is sent by the OAM entity to the CN node (when the UE is a roaming user equipment), or is sent by the OAM entity to the HSS and sent by the HSS to the CN node when the HSS detects that the user intention of the first UE is to permit performing the MDT (when the UE is a local user equipment). The configuring unit 133 is connected to the receiving unit 131, and is configured to configure a first MDT configuration message according to the MDT activation command. The sending unit 134 is configured to deliver the first MDT configuration message configured by the configuring unit 133 to the first UE to instruct the first UE to perform the MDT. FIG. 19 does not illustrate the optional solution.

Optionally, in the network element device in this embodiment, when the type of the MDT is signaling based MDT, and the reporting type of MDT data is real-time reporting, the network element device in this embodiment further includes a third receiving module 18 and a third sending module 19.

The third receiving module 18 is configured to: when a second UE performing the MDT in a previous PLMN moves to the current PLMN, receive a second MDT configuration message sent by the CN node, where the second MDT configuration message sent by the CN node is received from a previous CN node corresponding to the previous PLMN. The judging module 12 is further configured to judge whether the second UE can perform the MDT in the current PLMN. The third sending module 19 is connected to the third receiving module 18 and the judging module 12 respectively. The third sending module 19 is configured to: when the judging module 12 determines that the second UE can perform the MDT in the current PLMN, send the second MDT configuration message received by the third receiving module 18 to the second UE, so as to instruct the second UE to continue to perform the MDT.

Optionally, in the network element device in this embodiment, when the type of the MDT is signaling based MDT, and the reporting type of MDT data is real-time reporting, the third receiving module 18 is further configured to receive second MDT measurement data sent by the second UE. The third sending module 19 is further configured to send the second MDT measurement data to the CN node, so that the CN node sends the second MDT measurement data to the previous CN node, and the previous CN node sends the second MDT measurement data to the corresponding previous RNC/eNodeB, so that then the previous RNC/eNodeB sends the second MDT measurement data to the corresponding TCE.

Optionally, in the network element device in this embodiment, when the type of the MDT is signaling based MDT, and the reporting type of MDT measurement data is non-real-time reporting, the configuring unit 133 is specifically configured to configure, according to the MDT activation command received by the receiving unit 131, a first MDT configuration message carrying an address of a TCE and a trace reference.

Optionally, in the network element device in this embodiment, when the reporting type of the MDT measurement data is non-real-time reporting, no matter whether the type of the MDT is signaling based MDT or management based MDT, the network element device further includes a second determining module 20, configured to determine an area list for performing the MDT by the first UE. The configuring unit 133 is connected to the second determining module 20, and the configuring unit 133 is specifically configured to configure, according to the trace session activation message, the first MDT configuration message that carries the address of the TCE, the trace reference, and the area list that is determined by the second determining module 20; or specifically configured to configure, according to the MDT activation command, the first MDT configuration message that carries the address of the TCE, the trace reference, and the area list that is determined by the second determining module 20.

Further, optionally, in the network element device in this embodiment, when the reporting type of the MDT measurement data is non-real-time reporting, no matter whether the type of the MDT is signaling based MDT or management based MDT, the second determining module 20 may further include a judging unit 201 and a determining unit 202.

The judging unit 201 is configured to judge whether the current PLMN is an HPLMN or EHPLMN of the first UE. The determining unit 202 is connected to the judging unit 201, and the determining unit 202 is configured to: when the judging unit 201 determines that the current PLMN is the HPLMN or EHPLMN of the first UE, determine that the area list for performing the MDT by the first UE is an MDT PLMN List; and when the judging unit 201 determines that the current PLMN is not the HPLMN or EHPLMN of the first UE, determine that the area list for performing the MDT by the first UE includes the identity of the current PLMN, and the HPLMN identity and EHPLMN identity of the first UE. In this case, the configuring unit 133 is connected to the determining unit 202, and the configuring unit 133 is specifically configured to configure, according to the trace session activation message, the first MDT configuration message that carries the address of the TCE, the trace reference, and the area list that is determined by the second determining unit 202; or specifically configured to configure, according to the MDT activation command, the first MDT configuration message that carries the address of the TCE, the trace reference, and the area list that is determined by the determining unit 202.

Further, optionally, in the network element device in this embodiment, when the reporting type of the MDT measurement data is non-real-time reporting, no matter whether the type of the MDT is signaling based MDT or management based MDT, the network element device in this embodiment may further include a fourth receiving module 21 and a fourth sending module 22.

The fourth receiving module 21 is configured to: when a second UE performing the MDT in a previous PLMN moves to the current PLMN, receive an indication sent by the second UE for reporting MDT data. The fourth sending module 22 is connected to the fourth receiving module 21, and the fourth sending module 22 is configured to request MDT data from the second UE according to the indication received by the fourth receiving module 21 for reporting MDT data. The fourth receiving module 21 is further configured to receive MDT data that is sent by the second UE and carries the identity of the TCE and the identity of the previous PLMN. The fourth sending module 22 is further configured to: when an interface exists between the RNC/eNodeB and a previous radio network controller or base station corresponding to the previous PLMN, send the MDT data to the previous radio network controller or base station according to the identity of the previous PLMN, so that the previous radio network controller or base station sends the MDT data to the corresponding TCE according to the address of the TCE.

Optionally, when no interface exists between the RNC/eNodeB and the previous radio network controller or base station corresponding to the previous PLMN, the fourth sending module 22 is further configured to send the MDT data to the CN node corresponding to the current PLMN, so that the CN node sends the MDT data to the previous PLMN according to the identity of the previous PLMN in the MDT data, and the previous PLMN sends the MDT data to the corresponding previous radio network controller or base station, so that the previous radio network controller or base station sends the MDT data to the corresponding TCE according to the address of the TCE.

In the network element device in the embodiment of the present invention, the above included multiple optional embodiments are used as examples for describing the technical solution of the present invention. In an actual application, any combination of the optional technical solutions of signaling based MDT and management based MDT in the above embodiment may constitute an optional embodiment of the present invention.

In the network element device in the embodiment of the present invention, the implementation mechanism in which the above modules are used to implement the MDT control method is the same as the implementation mechanism of the extended embodiments of FIG. 1 and the related embodiments shown in FIG. 5A and FIG. 5B to FIG. 12A and FIG. 12B. For details, reference may be made to the description of the above related embodiments, which is not further described herein.

In the network element device in this embodiment, by using the above modules, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Figure 20:
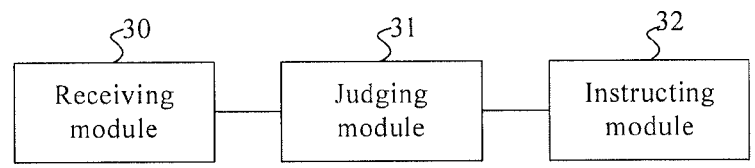
FIG. 20 is a structural diagram of a network element device according to another embodiment of the present invention.

FIG. 20 is a structural diagram of a network element device according to another embodiment of the present invention. As shown in FIG. 20, the network element device in this embodiment may include: a receiving module 30, a judging module 31, and an instructing module 32.

The receiving module 30 is configured to receive a user intention of a first UE and a corresponding MDT PLMN List that are sent by a CN node, where the MDT PLMN List includes at least two PLMN identities, and UEs in at least two PLMNs corresponding to the at least two PLMN identities can perform MDT in the at least two PLMNs. The judging module 31 is connected to the receiving module 30, and the judging module 31 is configured to: when the first UE accesses a current PLMN and the user intention of the first UE is to permit performing the MDT, judge whether the MDT PLMN List received by the receiving module 30 includes an identity of the current PLMN. The instructing module 32 is connected to the judging module 31, and the instructing module 32 is configured to: when the judging module 31 determines that the PLMN list includes the identity of the current PLMN, instruct the first UE to perform the MDT.

In the network element device in this embodiment, the implementation process in which the above modules are used to implement MDT control is the same as the implementation process of the above related method embodiment. For details, reference may be made to the description of the above method embodiment, which is not further described herein.

In the network element device in this embodiment, by using the above modules, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

Optionally, in the above embodiment, the user intention of the first UE and the corresponding MDT PLMN List that are sent by the CN node are acquired from an HSS.

Optionally, the MDT PLMN List in the above embodiment is configured as subscription information of a user in the HSS. In this embodiment, the network element device may be an RNC or an eNodeB.

Further, the network element device in this embodiment may also implement MDT control respectively according to management based MDT measurements and signaling based MDT measurements, and two reporting types of MDT measurement data: real-time reporting and non-real-time reporting. Specifically, the embodiment shown in FIG. 20, in combination with some modules or units in FIG. 18 or FIG. 19, may implement the technical solutions of FIG. 4 and extended embodiments and the embodiments of FIG. 13A and FIG. 13B to FIG. 16A and FIG. 16B respectively. For details, reference may be made to the description of the above embodiment, which is not further described herein.

An embodiment of the present invention further provides an MDT control system. The MDT control system may include any one of the network element devices in FIG. 17 to FIG. 20, and implement MDT control according to the above method embodiments in FIG. 1 to FIG. 16A and FIG. 16B. For details, reference may be made to the description of the above embodiment, which is not further described herein.

In the MDT control system in this embodiment, by using the above network element device, as long as the intention of the UE is to permit performing the MDT, and the MDT PLMN List includes the HPLMN identity or EHPLMN identity of the UE, the UE may be selected to perform the MDT. The technical solution of the embodiment of the present invention is used to solve the technical problem in the prior art that the UE can only perform MDT measurements in the scope of the current PLMN, namely, the HPLMN of the UE, so that the UE can perform MDT measurements after the UE moves to another PLMN.

The CN node in the embodiments of the present invention may be a serving GPRS support node (Serving GPRS Support Node, SGSN for short below), a mobile switching center (Mobile Switching Center, MSC for short below), or a mobility management entity (Mobility Management Entity, MME for short below).

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the scope of the technical solutions of the embodiments of the present invention.

What is claimed is:

1. A minimization of drive-tests control method, comprising:

acquiring, by a network element device, a minimization of drive-tests public land mobile network (MDT PLMN) list, wherein the MDT PLMN list comprises at least two PLMNs identities,
to thereby control, by the network element device, a selection of a first user equipment (UE) among user equipments (UEs) in at least two PLMNs corresponding to the at least two PLMNs identities in the MDT PLMN list to perform MDT in the at least two PLMNs;

when the first UE accesses a current PLMN among the at least two PLMNs, acquiring, by the network element device, information for a determination of whether an intention of the first UE is to permit performing the MDT in the current PLMN;

judging, by the network element device, whether the MDT PLMN list comprises at least a home public land mobile network (HPLMN) identity or an equivalent home public land mobile network (EHPLMN) identity of the first UE; and when the MDT PLMN list comprises the HPLMN identity or EHPLMN identity of the first UE, instructing, by the network element device, the first UE to perform the MDT in the current PLMN, wherein the network element device implements any one or a combination of functions of a core network (CN) node, a radio network controller (RNC) or a base station (BS), and the acquiring the information for the determination of the intention of the first UE to permit performing the MDT comprises acquiring the information by way of a home subscriber server (HSS) for the first UE.

2. The method according to claim 1, wherein:
in case the network element device is the CN node,
the acquiring, by the CN node, the MDT PLMN list comprises acquiring an MDT PLMN list pre-configured in the CN node by an operations, administration and maintenance (OAM) entity; and
the acquiring, by the CN node, the information for the determination that the intention of the first UE is to permit performing the MDT, comprises acquiring, by the CN node, from the HSS, that the intention of the first UE is to permit performing the MDT in the current PLMN.

3. The method according to claim 2, wherein when a type of the MDT is management based MDT, the instructing, by the CN node, the first UE to perform the MDT, comprises:
sending, by the CN node to a radio network controller (RNC) or base station, the intention of the first UE to permit performing the MDT, so as to instruct the RNC or BS to select the first UE to perform the MDT, and the RNC or BS delivers a first MDT configuration message to the first UE to instruct the first UE to perform the MDT, wherein the first MDT configuration message is configured by the RNC or BS according to a received trace session activation message that is sent by the OAM entity and carries a reporting type of MDT measurement data, an address of a trace collection entity, and a trace reference carrying an identity of the current PLMN.

4. The method according to claim 2, wherein when a type of the MDT is signaling based MDT, the method further comprises:
when the first UE is a roaming UE, receiving, by the CN node, a MDT activation command sent by the OAM entity, wherein the MDT activation command carries a reporting type of MDT measurement data, an address of a trace collection entity, an identity of the first UE, and a trace reference carrying an identity of the current PLMN; or
when the first UE is a local UE, receiving, by the CN node, a MDT activation command sent by the HSS, wherein the MDT activation command is sent by the HSS after the HSS determines that the intention of the first UE is to permit performing the MDT.

5. The method according to claim 4, wherein when the reporting type of MDT measurement data is real-time reporting, the method further comprises:
when a second UE performing the MDT in a previous PLMN moves to the current PLMN, receiving, by the CN node, a second MDT configuration message sent by a previous CN node corresponding to the previous PLMN;
judging, by the CN node, whether the second UE can perform the MDT in the current PLMN; and
when determining that the second UE can perform the MDT in the current PLMN, sending, by the CN node, the second MDT configuration message to the second UE through a radio network controller (RNC) or base station (BS), so as to instruct the second UE to continue to perform the MDT.

6. The method according to claim 5, wherein the determining, by the CN node, whether the second UE can perform the MDT in the current PLMN, comprises:
judging, by the CN, whether the MDT PLMN list comprises a HPLMN identity or an EHPLMN identity of the second UE, and when the MDT PLMN list comprises the HPLMN identity or EHPLMN identity of the second UE, judging that the second UE can perform the MDT in the current PLMN, otherwise, judging that the second UE cannot perform the MDT in the current PLMN.

7. The method according to claim 5, further comprising:
receiving, by the CN node, a second MDT measurement data that is sent by the second UE through the RNC or BS; and
sending, by the CN node, the second MDT measurement data to the previous CN node, so that the previous CM node sends the second MDT measurement data to a corresponding previous RNC or BS, and the previous RNC or BS sends the second MDT measurement data to a corresponding trace collection entity.

8. The method according to claim 1, wherein:
in case the network element device is the RNC or the BS,
the acquiring, by the RNC or BS, the MDT PLMN list comprises acquiring an MDT PLMN list pre-configured in the RNC or BS by an operations, administration and maintenance (OAM) entity; or receiving, by the RNC or BS, the MDT PLMN list sent by the CN node, wherein the MDT PLMN list is pre-configured in the CN node by the OAM entity; and
the acquiring, by the RNC or the BS, the information for the determination that the intention of the first UE is to permit performing the MDB, comprises receiving, by the RNC or BS, the information for the determination of the intention of the first UE to permit performing the MDT, which is sent by the CN node, wherein the information for the determination of the intention of the first UE to permit performing the MDT is acquired by the CN node from the HSS.

9. The method according to claim 8, wherein when a type of the MDT is management based MDT, the method further comprises:
receiving, by the RNC or BS, a trace session activation message sent by the OAM entity, wherein the trace session activation message carries a reporting type of MDT measurement data, an address of a trace collection entity, and a trace reference carrying an identity of the current PLMN.

10. The method according to claim 9, wherein the instructing, by the RNC or BS, the first UE to perform the MDT, comprises:
receiving, by the RNC or BS, the intention of the first UE to permit performing the MDT, which is sent by a core network (CN) node;
selecting, by the RNC or BS, the first UE to perform the MDT;
configuring, by the RNC or BS, a first MDT configuration message according to the trace session activation message; and
sending, by the RNC or BS, the first MDT configuration message to the first UE, so as to instruct the first UE to perform the MDT.

11. The method according to claim 10, wherein when the reporting type of MDT measurement data is non-real-time reporting, the configuring, by the RNC or BS, the first MDT configuration message according to the trace session activation message, comprises:
configuring, by the RNC or BS according to the trace session activation message, the first MDT configuration message carrying the address of the trace collection entity and the trace reference.

12. The method according to claim 11, further comprising:
determining, by the RNC or BS, an area list for performing the MDT by the first UE; wherein
the configuring, by the RNC or BS according to the trace session activation message, the first MDT configuration message carrying the address of the trace collection entity and the trace reference, comprises:
configuring, by the RNC or BS according to the trace session activation message, the first MDT configuration message carrying the address of the trace collection entity, the trace reference, and the area list; or
configuring, by the RNC or BS according to the trace session activation message, the first MDT configuration message carrying the address of the trace collection entity and the trace reference.

13. The method according to claim 12, wherein the determining, by the RNC or BS, the area list for performing the MDT by the first UE, comprises:
judging, by the RNC or BS, whether the current PLMN is a HPLMN or an EHPLMN of the first UE;
when the current PLMN is the HPLMN or EHPLMN of the first UE, determining, by the RNC or BS, that the area list for performing the MDT by the first UE is the MDT PLMN list; and
when the current PLMN is not the HPLMN or EHPLMN of the first UE, determining, by the RNC or BS, that the area list for performing the MDT by the first UE comprises an identity of the current PLMN, and the HPLMN identity and EHPLMN identity of the first UE.

14. The method according to claim 9, wherein when the reporting type of MDT measurement data is real-time reporting, the method further comprises:
when a second UE performing the MDT in a previous PLMN moves to the current PLMN, judging, by the RNC or BS, whether the second UE can continue to perform the MDT in the current PLMN; and
when judged that the second UE can continue to perform the MDT in the current PLMN, sending, by the RNC or BS, the first MDT configuration message to the second UE, so as to instruct the second UE to perform the MDT.

15. The method according to claim 14, wherein the judging, by the RNC or BS, whether the second UE can continue to perform the MDT in the current PLMN, comprises:
judging, by the RNC or BS, whether the MDT PLMN list comprises a HPLMN identity of the second UE or an EHPLMN identity of the second UE, and when the MDT PLMN list comprises the HPLMN of the second UE or the EHPLMN of the second UE, judging that the second UE can continue to perform the MDT in the current PLMN, otherwise, judging that the second UE cannot continue to perform the MDT in the current PLMN.

16. The method according to claim 1, further comprising:
sending, by the network element device, the MDT PLMN list to the first UE, so that the first UE determines, according to the MDT PLMN list, an area for performing the MDT.

17. A minimization of drive-tests control method, comprising:
receiving, by a network element device, information for a determination of an intention of a first user equipment (UE) and a corresponding minimization of drive-tests public land mobile network (MDT PLMN) list, sent by a network element implementing any one or a combination of functions of a core network (CN) node, a radio network controller (RNC) or a base station (BS), wherein the MDT PLMN list comprises at least two public land mobile network (PLMNs) identities,
to thereby control, by the network element device, a selection of the first UE in at least two PLMNs corresponding to the at least two PLMNs identities in the MDT PLMN list to perform MDT in the at least two PLMNs;
when the first UE accesses a current PLMN, and the intention of the first UE is determined to permit performing the MDT, judging, by the network element device, whether the MDT PLMN list comprises an identity of the current PLMN; and
when the PLMN list comprises the identity of the current PLMN, instructing, by the network element device, the first UE to perform the MDT,
wherein the information for the determination of the intention of the first UE to permit performing the MDT is received through the CN node, the RNC or the BS by way of a home subscriber server (HSS) for the first UE.

18. The method according to claim 17, wherein the corresponding MDT PLMN list that is sent by the CN node, the RNC or the BS is acquired by way of the HSS for the first UE.

19. A network element device, comprising:
a processor, configured to:
acquire a minimization of drive-tests public land mobile network (MDT PLMN) list, wherein the MDT PLMN list comprises at least two PLMNSs identities,
to thereby control a selection of a first user equipment (UE) among user equipments (UEs) in at least two PLMNs corresponding to the at least two PLMNs identities in the MDT PLMN list to perform MDT in the at least two PLMNs;
when the first UE accesses a current PLMN among the at least two PLMNs, acquire information for a determination of whether an intention of the first UE is to permit performing the MDT in the current PLMN; and
judge whether the MDT PLMN list comprises at least a home public land mobile network (HPLMN) identity or an equivalent home public land mobile network (EHPLMN) identity of the first UE; and
a transmitter, configured to: when the MDT PLMN list comprises the HPLMN identity or EHPLMN identity of the first UE, instruct the first UE to perform the MDT in the current PLMN,
wherein the information for the determination of the intention of the first UE to permit performing the MDT is acquired through a network element that implements any one or a combination of functions of a core network (CN) node, a radio network controller (RNC) or a base station (BS) by way of a home subscriber server (HSS) for the first UE.

20. The device according to claim 19, wherein when a type of the MDT is management based MDT, the transmitter is further configured to send, to the RNC or the BS, the intention of the first UE to permit performing the MDT, so as to instruct the RNC or BS to select the first UE to perform the MDT, and the RNC or BS delivers an MDT configuration message to the first UE to instruct the first UE to perform the MDT,
wherein the MDT configuration message is configured by the RNC or BS according to a received trace session activation message that is sent by an operations, administration and maintenance (OAM) entity and carries a reporting type of MDT measurement data, an address of a trace collection entity, and a trace reference carrying an identity of the current PLMN.

21. The device according to claim 20, wherein, the processor is further configured to:
   determine an area list for performing the MDT by the first UE; and
   configure, according to the trace session activation message, the MDT configuration message carrying the address of the trace collection entity, the trace reference, and the area list, or configure, according to an MDT activation command, the MDT configuration message carrying the address of the trace collection entity, the trace reference, and the area list.

22. The device according to claim 21, wherein, the processor is further configured to:
   judge whether the current PLMN is a home public land mobile network (HPLMN) or an equivalent home public land mobile network (EHPLMN) of the first UE;
   when the current PLMN is the HPLMN or EHPLMN of the first UE, determine that the area list for performing the MDT by the first UE is the MDT PLMN list; and when the current PLMN is not the HPLMN or EHPLMN of the first UE, determine that the area list for performing the MDT by the first UE comprises an identity of the current PLMN, and the HPLMN and EHPLMN identity of the first UE.

23. The device according to claim 22, further comprising:
   a receiver, configured to: when a second UE performing the MDT in a previous PLMN moves to the current PLMN, receive an indication sent by the second UE for reporting MDT measurement data; and
   wherein the transmitter is further configured to request the MDT measurement data from the second UE; wherein
   the receiver is further configured to receive the MDT measurement data that is sent by the second UE and carries an identity of the trace collection entity and an identity of the previous PLMN; and
   the transmitter is further configured to: when an interface exists between the RNC or BS and a previous RNC or BS corresponding to the previous PLMN, send the MDT measurement data to the previous RNC or BS according to the identity of the previous PLMN, so that the previous RNC or BS sends the MDT measurement data to the corresponding trace collection entity according to the address of the trace collection entity.

24. The device according to claim 19, wherein when a type of the MDT is management based MDT, the device further comprises:
   a receiver, configured to receive a trace session activation message sent by an operations, administration and maintenance (OAM) entity, wherein the trace session activation message carries a reporting type of MDT measurement data, an address of a trace collection entity, and a trace reference carrying an identity of the current MPLN.

25. The device according to claim 24, wherein: when the reporting type of MDT measurement data is real-time reporting, the processor is further configured to: when a second UE performing the MDT in a previous PLMN moves to the current PLMN, judge whether the second UE can continue to perform the MDT in the current PLMN; and
   the transmitter is further configured to: when the second UE can continue to perform the MDT in the current PLMN, send an MDT configuration message to the second UE, so as to instruct the second UE to perform the MDT.

26. The device according to claim 25, wherein the processor is configured to judge whether the MDT PLMN list comprises a home public land mobile network (HPLMN) identity of the second UE or an equivalent home public land mobile network (EHPLMN) identity of the second UE, and when the MDT HPLMN list comprises the HPLMN identity of the second UE or the EHPLMN identity of the second UE, judge that the UE can continue to perform the MDT in the current PLMN; otherwise, judge that the second UE cannot continue to perform the MDT in the current PLMN.

27. A network element device, comprising:
   a receiver, configured to receive information for a determination of an intention of a first user equipment (UE) and a corresponding minimization of drive-tests public land mobile network (MDT PLMN) list, sent by a network element implementing any one or a combination of functions of a core network (CN) node, a radio network controller (RNC) or a base station (BS), wherein the MDT PLMN list comprises at least two public land mobile network (PLMNs) identities,
   to thereby control a selection of the first UE in at least two PLMNs corresponding to the at least two PLMNs identities in the MDT PLMN list to perform MDT in the at least two PLMNs;
   a processor, configured to:
      when the first UE accesses a current PLMN, and the intention of the first UE is determined to permit performing the MDT, judge whether the MDT PLMN list comprises an identity of the current PLMN; and
   a transmitter, configured to: when the MDT PLMN list comprises the identity of the current PLMN, instruct the first UE to perform the MDT,
   wherein the information for the determination of the intention of the first UE to permit performing the MDT is received through the CN node, the RNC or the BS by way of a home subscriber server (HSS) for the first UE.

* * * * *